(12) United States Patent
Petrovic et al.

(10) Patent No.: US 9,251,549 B2
(45) Date of Patent: Feb. 2, 2016

(54) WATERMARK EXTRACTOR ENHANCEMENTS BASED ON PAYLOAD RANKING

(71) Applicant: Verance Corporation, San Diego, CA (US)

(72) Inventors: Rade Petrovic, San Diego, CA (US); Joseph M. Winograd, San Diego, CA (US); Patrick George Downes, San Diego, CA (US)

(73) Assignee: Verance Corporation, San Diego, CA (US)

( * ) Notice: Subject to any disclaimer, the term of this patent is extended or adjusted under 35 U.S.C. 154(b) by 254 days.

(21) Appl. No.: 13/948,618

(22) Filed: Jul. 23, 2013

(65) Prior Publication Data

US 2015/0030200 A1 Jan. 29, 2015

(51) Int. Cl.
G06T 1/00 (2006.01)

(52) U.S. Cl.
CPC ............. G06T 1/005 (2013.01); G06T 1/0028 (2013.01); *G06T 2201/0065* (2013.01); *G06T 2201/0202* (2013.01)

(58) Field of Classification Search
None
See application file for complete search history.

(56) References Cited

U.S. PATENT DOCUMENTS

| | | |
|---|---|---|
| 3,406,344 A | 10/1968 | Hopper |
| 3,842,196 A | 10/1974 | Loughlin |
| 3,885,217 A | 5/1975 | Cintron |
| 3,894,190 A | 7/1975 | Gassmann |
| 3,919,479 A | 11/1975 | Moon et al. |
| 3,973,206 A | 8/1976 | Haselwood et al. |
| 4,048,562 A | 9/1977 | Haselwood et al. |

(Continued)

FOREIGN PATENT DOCUMENTS

| | | |
|---|---|---|
| CA | 2276638 A1 | 1/2000 |
| CN | 1447269 | 10/2003 |

(Continued)

OTHER PUBLICATIONS

Wang, Honggang. "Communication-resource-aware adaptive watermarking for multimedia authentication in wireless multimedia sensor networks." The Journal of Supercomputing 64, No. 3 (Jun. 1, 2013): 883-897.*

(Continued)

*Primary Examiner* — Vikkram Bali
*Assistant Examiner* — Tracy Mangialaschi
(74) *Attorney, Agent, or Firm* — Perkins Coie LLP; Donald L. Wenskay

(57) ABSTRACT

Methods, devices, systems and computer program products improve the detection of watermarks that are embedded in a host content by providing information indicative of a ranking of watermark payloads to watermark extractors. A watermark extractor device obtains information indicative of a ranking of a plurality of watermark payload values, where such information designates each watermark payload value within a first subset of the plurality of watermark payload values as having an associated rank value. Based at least in-part on the information indicative of the ranking, the watermark extractor device is configured to prioritize resource allocation for extraction of payload values that are designated as belonging to the first subset over payload values that are not designated as belonging to the first subset. The watermark extractor then extracts a payload value, designated as belonging to the first subset, from one or more watermarks embedded in the host content.

55 Claims, 4 Drawing Sheets

(56) References Cited

U.S. PATENT DOCUMENTS

| | | |
|---|---|---|
| 4,176,379 A | 11/1979 | Wessler et al. |
| 4,199,788 A | 4/1980 | Tsujimura |
| 4,225,967 A | 9/1980 | Miwa et al. |
| 4,230,990 A | 10/1980 | Lert, Jr. et al. |
| 4,281,217 A | 7/1981 | Dolby |
| 4,295,128 A | 10/1981 | Hashemian et al. |
| 4,425,578 A | 1/1984 | Haselwood et al. |
| 4,454,610 A | 6/1984 | Sziklai |
| 4,464,656 A | 8/1984 | Nakamura |
| 4,497,060 A | 1/1985 | Yang |
| 4,512,013 A | 4/1985 | Nash et al. |
| 4,547,804 A | 10/1985 | Greenberg |
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,523,794 A | 6/1996 | Mankovitz et al. |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,809,139 A | 9/1998 | Girod et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,870,030 A | 2/1999 | DeLuca et al. |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,037,984 A | 3/2000 | Isnardi et al. |
| 6,044,156 A | 3/2000 | Honsinger et al. |
| 6,061,793 A | 5/2000 | Tewfik et al. |
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,128,597 A | 10/2000 | Kolluru et al. |

(56) References Cited

U.S. PATENT DOCUMENTS

| | | |
|---|---|---|
| 6,145,081 A | 11/2000 | Winograd et al. |
| 6,154,571 A | 11/2000 | Cox et al. |
| 6,160,986 A | 12/2000 | Gabai et al. |
| 6,173,271 B1 | 1/2001 | Goodman et al. |
| 6,175,627 B1 | 1/2001 | Petrovic et al. |
| 6,175,842 B1 | 1/2001 | Kirk et al. |
| 6,189,123 B1 | 2/2001 | Anders Nystrom et al. |
| 6,209,092 B1 | 3/2001 | Linnartz |
| 6,209,094 B1 | 3/2001 | Levine et al. |
| 6,222,932 B1 | 4/2001 | Rao et al. |
| 6,229,572 B1 | 5/2001 | Ciardullo et al. |
| 6,233,347 B1 | 5/2001 | Chen et al. |
| 6,246,775 B1 | 6/2001 | Nakamura et al. |
| 6,246,802 B1 | 6/2001 | Fujihara et al. |
| 6,249,870 B1 | 6/2001 | Kobayashi et al. |
| 6,252,972 B1 | 6/2001 | Linnartz |
| 6,253,113 B1 | 6/2001 | Lu |
| 6,253,189 B1 | 6/2001 | Feezell et al. |
| 6,268,866 B1 | 7/2001 | Shibata |
| 6,278,792 B1 | 8/2001 | Cox et al. |
| 6,282,299 B1 | 8/2001 | Tewfik et al. |
| 6,285,774 B1 | 9/2001 | Schumann et al. |
| 6,289,108 B1 | 9/2001 | Rhoads |
| 6,290,566 B1 | 9/2001 | Gabai et al. |
| 6,330,335 B1 | 12/2001 | Rhoads |
| 6,330,672 B1 | 12/2001 | Shur |
| 6,332,031 B1 | 12/2001 | Rhoads et al. |
| 6,332,194 B1 | 12/2001 | Bloom et al. |
| 6,353,672 B1 | 3/2002 | Rhoads |
| 6,363,159 B1 | 3/2002 | Rhoads |
| 6,373,974 B2 | 4/2002 | Zeng |
| 6,374,036 B1 | 4/2002 | Ryan et al. |
| 6,381,341 B1 | 4/2002 | Rhoads |
| 6,385,330 B1 | 5/2002 | Powell et al. |
| 6,388,712 B1 | 5/2002 | Shinohara et al. |
| 6,389,152 B2 | 5/2002 | Nakamura et al. |
| 6,389,538 B1 | 5/2002 | Gruse et al. |
| 6,400,826 B1 | 6/2002 | Chen et al. |
| 6,400,827 B1 | 6/2002 | Rhoads |
| 6,404,781 B1 | 6/2002 | Kawamae et al. |
| 6,404,898 B1 | 6/2002 | Rhoads |
| 6,411,725 B1 | 6/2002 | Rhoads |
| 6,415,040 B1 | 7/2002 | Linnartz et al. |
| 6,415,041 B1 | 7/2002 | Oami et al. |
| 6,424,726 B2 | 7/2002 | Nakano et al. |
| 6,427,012 B1 | 7/2002 | Petrovic |
| 6,430,301 B1 | 8/2002 | Petrovic |
| 6,430,302 B2 | 8/2002 | Rhoads |
| 6,442,285 B2 | 8/2002 | Rhoads et al. |
| 6,449,367 B2 | 9/2002 | Van Wie et al. |
| 6,449,496 B1 | 9/2002 | Beith et al. |
| 6,473,560 B1 | 10/2002 | Linnartz et al. |
| 6,477,431 B1 | 11/2002 | Kalker et al. |
| 6,487,301 B1 | 11/2002 | Zhao |
| 6,490,355 B1 | 12/2002 | Epstein |
| 6,496,591 B1 | 12/2002 | Rhoads |
| 6,505,160 B1 | 1/2003 | Levy et al. |
| 6,510,233 B1 | 1/2003 | Nakano |
| 6,510,234 B1 | 1/2003 | Cox et al. |
| 6,512,837 B1 | 1/2003 | Ahmed |
| 6,523,113 B1 | 2/2003 | Wehrenberg |
| 6,529,506 B1 | 3/2003 | Yamamoto et al. |
| 6,530,021 B1 | 3/2003 | Epstein et al. |
| 6,535,617 B1 | 3/2003 | Hannigan et al. |
| 6,550,011 B1 | 4/2003 | Sims, III |
| 6,553,127 B1 | 4/2003 | Kurowski |
| 6,556,688 B1 | 4/2003 | Ratnakar |
| 6,557,103 B1 | 4/2003 | Boncelet, Jr. et al. |
| 6,570,996 B1 | 5/2003 | Linnartz |
| 6,571,144 B1 | 5/2003 | Moses et al. |
| 6,574,350 B1 | 6/2003 | Rhoads et al. |
| 6,577,744 B1 | 6/2003 | Braudaway et al. |
| 6,584,138 B1 | 6/2003 | Neubauer et al. |
| 6,590,996 B1 | 7/2003 | Reed et al. |
| 6,590,997 B2 | 7/2003 | Rhoads |
| 6,591,365 B1 | 7/2003 | Cookson |
| 6,592,516 B2 | 7/2003 | Lee |
| 6,598,162 B1 | 7/2003 | Moskowitz |
| 6,614,914 B1 | 9/2003 | Rhoads et al. |
| 6,618,484 B1 | 9/2003 | Weber et al. |
| 6,625,297 B1 | 9/2003 | Bradley |
| 6,628,729 B1 | 9/2003 | Sorensen |
| 6,633,653 B1 | 10/2003 | Hobson et al. |
| 6,636,615 B1 | 10/2003 | Rhoads et al. |
| 6,636,967 B1 | 10/2003 | Koyano |
| 6,647,128 B1 | 11/2003 | Rhoads |
| 6,647,129 B2 | 11/2003 | Rhoads |
| 6,654,501 B1 | 11/2003 | Acharya et al. |
| 6,661,905 B1 | 12/2003 | Chupp et al. |
| 6,665,419 B1 | 12/2003 | Oami |
| 6,668,068 B2 | 12/2003 | Hashimoto |
| 6,671,376 B1 | 12/2003 | Koto et al. |
| 6,671,388 B1 | 12/2003 | Op De Beeck et al. |
| 6,674,861 B1 | 1/2004 | Xu et al. |
| 6,674,876 B1 | 1/2004 | Hannigan et al. |
| 6,675,146 B2 | 1/2004 | Rhoads |
| 6,678,389 B1 | 1/2004 | Sun et al. |
| 6,681,029 B1 | 1/2004 | Rhoads |
| 6,683,958 B2 | 1/2004 | Petrovic |
| 6,697,944 B1 | 2/2004 | Jones et al. |
| 6,700,990 B1 | 3/2004 | Rhoads |
| 6,704,431 B1 | 3/2004 | Ogawa et al. |
| 6,707,926 B1 | 3/2004 | Macy et al. |
| 6,721,439 B1 | 4/2004 | Levy et al. |
| 6,728,390 B2 | 4/2004 | Rhoads et al. |
| 6,737,957 B1 | 5/2004 | Petrovic et al. |
| 6,738,495 B2 | 5/2004 | Rhoads et al. |
| 6,744,906 B2 | 6/2004 | Rhoads et al. |
| 6,748,360 B2 | 6/2004 | Pitman et al. |
| 6,751,337 B2 | 6/2004 | Tewfik et al. |
| 6,757,405 B1 | 6/2004 | Muratani et al. |
| 6,757,908 B1 | 6/2004 | Vogel |
| 6,760,463 B2 | 7/2004 | Rhoads |
| 6,768,807 B1 | 7/2004 | Muratani |
| 6,771,797 B2 | 8/2004 | Ahmed |
| 6,785,399 B2 | 8/2004 | Fujihara |
| 6,785,401 B2 | 8/2004 | Walker et al. |
| 6,785,815 B1 | 8/2004 | Serret-Avila et al. |
| 6,792,542 B1 | 9/2004 | Lee et al. |
| 6,798,893 B1 | 9/2004 | Tanaka |
| 6,801,999 B1 | 10/2004 | Venkatesan et al. |
| 6,810,527 B1 | 10/2004 | Conrad et al. |
| 6,823,455 B1 | 11/2004 | Macy et al. |
| 6,829,368 B2 | 12/2004 | Meyer et al. |
| 6,829,582 B1 | 12/2004 | Barsness |
| 6,834,344 B1 | 12/2004 | Aggarwal et al. |
| 6,834,345 B2 | 12/2004 | Bloom et al. |
| 6,850,555 B1 | 2/2005 | Barclay |
| 6,850,626 B2 | 2/2005 | Rhoads et al. |
| 6,856,693 B2 | 2/2005 | Miller |
| 6,871,180 B1 | 3/2005 | Neuhauser et al. |
| 6,880,082 B2 | 4/2005 | Ohta |
| 6,888,943 B1 | 5/2005 | Lam et al. |
| 6,891,958 B2 | 5/2005 | Kirovski et al. |
| 6,912,010 B2 | 6/2005 | Baker et al. |
| 6,912,294 B2 | 6/2005 | Wang et al. |
| 6,912,315 B1 | 6/2005 | Wong et al. |
| 6,915,002 B2 | 7/2005 | Gustafson |
| 6,915,422 B1 | 7/2005 | Nakamura |
| 6,915,481 B1 | 7/2005 | Tewfik et al. |
| 6,928,233 B1 | 8/2005 | Walker et al. |
| 6,931,536 B2 | 8/2005 | Hollar |
| 6,944,313 B1 | 9/2005 | Donescu |
| 6,944,771 B2 | 9/2005 | Epstein |
| 6,947,571 B1 | 9/2005 | Rhoads et al. |
| 6,947,893 B1 | 9/2005 | Iwaki et al. |
| 6,952,774 B1 | 10/2005 | Kirovski et al. |
| 6,954,541 B2 | 10/2005 | Fan et al. |
| 6,961,854 B2 | 11/2005 | Serret-Avila et al. |
| 6,973,195 B1 | 12/2005 | Matsui |
| 6,993,154 B2 | 1/2006 | Brunk |
| 6,996,249 B2 | 2/2006 | Miller et al. |
| 7,007,166 B1 | 2/2006 | Moskowitz et al. |
| 7,020,304 B2 | 3/2006 | Alattar et al. |

(56) References Cited

U.S. PATENT DOCUMENTS

| | | |
|---|---|---|
| 7,024,018 B2 | 4/2006 | Petrovic |
| 7,043,049 B2 | 5/2006 | Kuzma |
| 7,043,536 B1 | 5/2006 | Philyaw et al. |
| 7,043,638 B2 | 5/2006 | McGrath et al. |
| 7,046,808 B1 | 5/2006 | Metois et al. |
| 7,054,461 B2 | 5/2006 | Zeller et al. |
| 7,054,462 B2 | 5/2006 | Rhoads et al. |
| 7,058,809 B2 | 6/2006 | White et al. |
| 7,058,815 B2 | 6/2006 | Morin |
| 7,068,809 B2 | 6/2006 | Stach |
| 7,072,492 B2 | 7/2006 | Ogawa et al. |
| 7,103,678 B2 | 9/2006 | Asai et al. |
| 7,107,452 B2 | 9/2006 | Serret-Avila et al. |
| 7,111,169 B2 | 9/2006 | Ripley et al. |
| 7,113,613 B2 | 9/2006 | Echizen et al. |
| 7,123,718 B1 | 10/2006 | Moskowitz et al. |
| 7,142,691 B2 | 11/2006 | Levy |
| 7,162,642 B2 | 1/2007 | Schumann et al. |
| 7,164,778 B1 | 1/2007 | Nakamura et al. |
| 7,167,560 B2 | 1/2007 | Yu |
| 7,167,599 B1 | 1/2007 | Diehl |
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,224,819 B2 | 5/2007 | Levy et al. |
| 7,231,061 B2 | 6/2007 | Bradley |
| 7,289,643 B2 | 10/2007 | Brunk et al. |
| 7,298,865 B2 | 11/2007 | Lubin et al. |
| 7,319,759 B1 | 1/2008 | Peinado et al. |
| 7,321,666 B2 | 1/2008 | Kunisa |
| 7,334,247 B1 | 2/2008 | Finseth et al. |
| 7,336,802 B2 | 2/2008 | Kunisa |
| 7,346,514 B2 | 3/2008 | Herre et al. |
| 7,369,677 B2 | 5/2008 | Petrovic et al. |
| 7,369,678 B2 | 5/2008 | Rhoads |
| 7,389,421 B2 | 6/2008 | Kirovski et al. |
| 7,409,073 B2 | 8/2008 | Moskowitz et al. |
| 7,430,670 B1 | 9/2008 | Horning et al. |
| 7,450,727 B2 | 11/2008 | Griesinger |
| 7,454,019 B2 | 11/2008 | Williams |
| 7,562,392 B1 | 7/2009 | Rhoads et al. |
| 7,581,103 B2 | 8/2009 | Home et al. |
| 7,587,601 B2 | 9/2009 | Levy et al. |
| 7,616,776 B2 | 11/2009 | Petrovic et al. |
| 7,617,509 B1 | 11/2009 | Brunheroto et al. |
| 7,630,497 B2 | 12/2009 | Lotspiech et al. |
| 7,644,282 B2 | 1/2010 | Petrovic et al. |
| 7,660,991 B2 | 2/2010 | Nakamura et al. |
| 7,664,332 B2 | 2/2010 | Wong et al. |
| 7,693,297 B2 | 4/2010 | Zhang et al. |
| 7,698,570 B2 | 4/2010 | Schumann et al. |
| 7,756,272 B2 | 7/2010 | Kocher et al. |
| 7,788,684 B2 | 8/2010 | Petrovic et al. |
| 7,788,693 B2 | 8/2010 | Robbins |
| 7,797,637 B2 | 9/2010 | Marcjan |
| 7,818,763 B2 | 10/2010 | Sie et al. |
| 7,840,006 B2 | 11/2010 | Ogawa et al. |
| 7,979,881 B1 | 7/2011 | Wong et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,005,258 B2 | 8/2011 | Petrovic et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,059,858 B2 | 11/2011 | Brundage et al. |
| 8,106,744 B2 | 1/2012 | Petrovic et al. |
| 8,106,745 B2 | 1/2012 | Petrovic et al. |
| 8,138,930 B1 | 3/2012 | Heath |
| 8,151,113 B2 | 4/2012 | Rhoads |
| 8,155,463 B2 | 4/2012 | Wong et al. |
| 8,181,262 B2 | 5/2012 | Cooper et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,259,938 B2 | 9/2012 | Petrovic et al. |
| 8,301,893 B2 | 10/2012 | Brundage |
| 8,315,835 B2 | 11/2012 | Tian et al. |
| 8,346,532 B2 | 1/2013 | Chakra et al. |
| 8,346,567 B2 | 1/2013 | Petrovic et al. |
| 8,451,086 B2 | 5/2013 | Petrovic et al. |
| 8,467,717 B2 | 6/2013 | Croy et al. |
| 8,479,225 B2 | 7/2013 | Covell et al. |
| 8,538,066 B2 | 9/2013 | Petrovic et al. |
| 8,588,459 B2 | 11/2013 | Bloom et al. |
| 8,589,969 B2 | 11/2013 | Falcon |
| 8,681,978 B2 | 3/2014 | Petriovic et al. |
| 8,791,789 B2 | 7/2014 | Petrovic et al. |
| 2001/0001159 A1 | 5/2001 | Ford |
| 2001/0021926 A1 | 9/2001 | Schneck et al. |
| 2001/0022786 A1 | 9/2001 | King et al. |
| 2001/0025341 A1 | 9/2001 | Marshall |
| 2001/0044899 A1 | 11/2001 | Levy |
| 2001/0051996 A1 | 12/2001 | Cooper et al. |
| 2001/0054146 A1 | 12/2001 | Carro et al. |
| 2002/0007403 A1 | 1/2002 | Echizen et al. |
| 2002/0010684 A1 | 1/2002 | Moskowitz |
| 2002/0012443 A1 | 1/2002 | Rhoads et al. |
| 2002/0019769 A1 | 2/2002 | Barritz et al. |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0068987 A1 | 6/2002 | Hars |
| 2002/0078356 A1 | 6/2002 | Ezaki et al. |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1 | 8/2002 | McKinley et al. |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168082 A1 | 11/2002 | Razdan |
| 2002/0168087 A1 | 11/2002 | Petrovic |
| 2002/0178368 A1 | 11/2002 | Yin et al. |
| 2002/0181706 A1 | 12/2002 | Matsumura et al. |
| 2002/0199106 A1 | 12/2002 | Hayashi |
| 2003/0009671 A1 | 1/2003 | Yacobi et al. |
| 2003/0012098 A1 | 1/2003 | Sako et al. |
| 2003/0012403 A1 | 1/2003 | Rhoads et al. |
| 2003/0016825 A1 | 1/2003 | Jones |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |
| 2003/0032033 A1 | 2/2003 | Anglin et al. |
| 2003/0033321 A1 | 2/2003 | Schrempp et al. |
| 2003/0037075 A1 | 2/2003 | Hannigan et al. |
| 2003/0051143 A1 | 3/2003 | Razdan et al. |
| 2003/0053655 A1 | 3/2003 | Barone et al. |
| 2003/0056103 A1 | 3/2003 | Levy et al. |
| 2003/0056213 A1 | 3/2003 | McFaddin et al. |
| 2003/0061489 A1 | 3/2003 | Pelly et al. |
| 2003/0063570 A1* | 4/2003 | Katayama et al. ............ 370/252 |
| 2003/0063747 A1 | 4/2003 | Petrovic |
| 2003/0070075 A1 | 4/2003 | Deguillaume et al. |
| 2003/0072468 A1 | 4/2003 | Brunk et al. |
| 2003/0076955 A1 | 4/2003 | Alve et al. |
| 2003/0078891 A1 | 4/2003 | Capitant |
| 2003/0081780 A1 | 5/2003 | Kim |
| 2003/0081809 A1 | 5/2003 | Fridrich et al. |
| 2003/0112974 A1 | 6/2003 | Levy |
| 2003/0112997 A1 | 6/2003 | Ahmed |
| 2003/0115504 A1 | 6/2003 | Holliman et al. |
| 2003/0131350 A1 | 7/2003 | Peiffer et al. |
| 2003/0152225 A1 | 8/2003 | Kunisa |
| 2003/0174862 A1 | 9/2003 | Rhoads et al. |
| 2003/0177359 A1 | 9/2003 | Bradley |

(56) References Cited

U.S. PATENT DOCUMENTS

| | | |
|---|---|---|
| 2003/0179901 A1 | 9/2003 | Tian et al. |
| 2003/0185417 A1 | 10/2003 | Alattar et al. |
| 2003/0187679 A1 | 10/2003 | Odgers et al. |
| 2003/0188166 A1 | 10/2003 | Pelly et al. |
| 2003/0190054 A1 | 10/2003 | Troyansky et al. |
| 2003/0190055 A1 | 10/2003 | Kalker et al. |
| 2003/0191941 A1 | 10/2003 | Terada et al. |
| 2003/0200438 A1 | 10/2003 | Kirovski et al. |
| 2003/0223584 A1 | 12/2003 | Bradley et al. |
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025023 A1 | 2/2004 | Yamada et al. |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0042636 A1 | 3/2004 | Oh |
| 2004/0073916 A1 | 4/2004 | Petrovic et al. |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093202 A1 | 5/2004 | Fischer et al. |
| 2004/0093523 A1 | 5/2004 | Matsuzaki et al. |
| 2004/0098593 A1 | 5/2004 | Muratani |
| 2004/0101160 A1 | 5/2004 | Kunisa |
| 2004/0103293 A1 | 5/2004 | Ryan |
| 2004/0111740 A1 | 6/2004 | Seok et al. |
| 2004/0120544 A1 | 6/2004 | Eguchi et al. |
| 2004/0133794 A1 | 7/2004 | Kocher et al. |
| 2004/0136531 A1 | 7/2004 | Asano et al. |
| 2004/0151316 A1 | 8/2004 | Petrovic |
| 2004/0169581 A1 | 9/2004 | Petrovic et al. |
| 2004/0174996 A1 | 9/2004 | Tewfik et al. |
| 2004/0202324 A1 | 10/2004 | Yamaguchi et al. |
| 2004/0204943 A1 | 10/2004 | Kirovski et al. |
| 2004/0216157 A1 | 10/2004 | Shain et al. |
| 2004/0250078 A1 | 12/2004 | Stach et al. |
| 2004/0258274 A1 | 12/2004 | Brundage et al. |
| 2004/0260930 A1 | 12/2004 | Malik et al. |
| 2005/0008190 A1 | 1/2005 | Levy et al. |
| 2005/0010779 A1 | 1/2005 | Kobayashi et al. |
| 2005/0013462 A1 | 1/2005 | Rhoads |
| 2005/0025332 A1 | 2/2005 | Seroussi |
| 2005/0050332 A1 | 3/2005 | Serret-Avila et al. |
| 2005/0063027 A1 | 3/2005 | Durst et al. |
| 2005/0071283 A1 | 3/2005 | Randle et al. |
| 2005/0071669 A1 | 3/2005 | Medvinsky et al. |
| 2005/0120220 A1 | 6/2005 | Oostveen et al. |
| 2005/0144632 A1 | 6/2005 | Mears et al. |
| 2005/0154891 A1 | 7/2005 | Skipper |
| 2005/0177861 A1 | 8/2005 | Ma et al. |
| 2005/0196051 A1 | 9/2005 | Wong et al. |
| 2005/0202781 A1 | 9/2005 | Steelberg et al. |
| 2005/0242568 A1 | 11/2005 | Long et al. |
| 2005/0251683 A1 | 11/2005 | Levy et al. |
| 2005/0254649 A1 | 11/2005 | Demos |
| 2005/0267928 A1 | 12/2005 | Anderson et al. |
| 2006/0005029 A1 | 1/2006 | Petrovic et al. |
| 2006/0015927 A1 | 1/2006 | Antonellis et al. |
| 2006/0056653 A1 | 3/2006 | Kunisa |
| 2006/0062426 A1 | 3/2006 | Levy et al. |
| 2006/0075424 A1 | 4/2006 | Talstra et al. |
| 2006/0104477 A1 | 5/2006 | Isogai et al. |
| 2006/0133644 A1 | 6/2006 | Wells et al. |
| 2006/0156009 A1 | 7/2006 | Shin et al. |
| 2006/0190403 A1 | 8/2006 | Lin et al. |
| 2006/0218604 A1 | 9/2006 | Riedl et al. |
| 2006/0227968 A1 | 10/2006 | Chen et al. |
| 2006/0239501 A1 | 10/2006 | Petrovic et al. |
| 2007/0003103 A1 | 1/2007 | Lemma et al. |
| 2007/0005500 A1 | 1/2007 | Steeves et al. |
| 2007/0033146 A1 | 2/2007 | Hollar |
| 2007/0039018 A1 | 2/2007 | Saslow et al. |
| 2007/0064545 A1 | 3/2007 | Carson et al. |
| 2007/0100483 A1 | 5/2007 | Kentish et al. |
| 2007/0110237 A1 | 5/2007 | Tehranchi et al. |
| 2007/0143617 A1 | 6/2007 | Farber et al. |
| 2007/0150418 A1 | 6/2007 | Ben-Menahem et al. |
| 2007/0168673 A1 | 7/2007 | Van Der Veen et al. |
| 2007/0177761 A1 | 8/2007 | Levy |
| 2007/0192261 A1 | 8/2007 | Kelkar et al. |
| 2007/0208711 A1 | 9/2007 | Rhoads et al. |
| 2007/0214049 A1 | 9/2007 | Postrel |
| 2007/0223708 A1 | 9/2007 | Villemoes et al. |
| 2008/0002854 A1 | 1/2008 | Tehranchi et al. |
| 2008/0016360 A1 | 1/2008 | Rodriguez et al. |
| 2008/0031463 A1 | 2/2008 | Davis |
| 2008/0209219 A1 | 8/2008 | Rhein |
| 2008/0219643 A1 | 9/2008 | Le Buhan et al. |
| 2008/0228733 A1 | 9/2008 | Davis et al. |
| 2008/0250240 A1 | 10/2008 | Celik et al. |
| 2008/0273861 A1 | 11/2008 | Yang et al. |
| 2008/0281448 A1 | 11/2008 | Uhrig et al. |
| 2008/0298632 A1 | 12/2008 | Reed |
| 2008/0301304 A1 | 12/2008 | Chitsaz et al. |
| 2008/0310629 A1 | 12/2008 | Van Der Veen et al. |
| 2008/0310673 A1* | 12/2008 | Petrovic et al. ............... 382/100 |
| 2008/0313741 A1 | 12/2008 | Alve et al. |
| 2009/0031134 A1 | 1/2009 | Levy |
| 2009/0033617 A1 | 2/2009 | Lindberg et al. |
| 2009/0100492 A1 | 4/2009 | Hicks, III et al. |
| 2009/0136082 A1 | 5/2009 | Zandifar et al. |
| 2009/0158318 A1 | 6/2009 | Levy |
| 2009/0172405 A1 | 7/2009 | Shiomi et al. |
| 2009/0175594 A1 | 7/2009 | Ann et al. |
| 2009/0177674 A1 | 7/2009 | Yoshida |
| 2009/0208008 A1 | 8/2009 | Lubin |
| 2009/0262932 A1 | 10/2009 | Petrovic |
| 2009/0268942 A1 | 10/2009 | Price |
| 2009/0319639 A1 | 12/2009 | Gao et al. |
| 2009/0326961 A1 | 12/2009 | Petrovic et al. |
| 2010/0011217 A1 | 1/2010 | Tachibana et al. |
| 2010/0023489 A1 | 1/2010 | Miyata et al. |
| 2010/0034513 A1 | 2/2010 | Nakano et al. |
| 2010/0069151 A1 | 3/2010 | Suchocki |
| 2010/0111355 A1 | 5/2010 | Petrovic et al. |
| 2010/0115267 A1 | 5/2010 | Guo et al. |
| 2010/0121608 A1 | 5/2010 | Tian et al. |
| 2010/0146286 A1 | 6/2010 | Petrovic et al. |
| 2010/0159425 A1 | 6/2010 | Hamlin |
| 2010/0162352 A1 | 6/2010 | Haga et al. |
| 2010/0214307 A1 | 8/2010 | Lee et al. |
| 2010/0226525 A1 | 9/2010 | Levy et al. |
| 2010/0228632 A1 | 9/2010 | Rodriguez |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2010/0332723 A1 | 12/2010 | Lin et al. |
| 2011/0016172 A1 | 1/2011 | Shah |
| 2011/0068898 A1 | 3/2011 | Petrovic et al. |
| 2011/0091066 A1 | 4/2011 | Alattar |
| 2011/0103444 A1 | 5/2011 | Baum et al. |
| 2011/0123063 A1 | 5/2011 | Delp et al. |
| 2011/0173210 A1 | 7/2011 | Ahn et al. |
| 2011/0185179 A1 | 7/2011 | Swaminathan et al. |
| 2011/0194727 A1 | 8/2011 | Guo et al. |
| 2011/0202687 A1 | 8/2011 | Glitsch et al. |
| 2011/0202844 A1 | 8/2011 | Davidson et al. |
| 2011/0209191 A1 | 8/2011 | Shah |
| 2011/0909191 | 8/2011 | Shah |
| 2011/0214044 A1 | 9/2011 | Davis et al. |
| 2011/0214143 A1 | 9/2011 | Rits et al. |
| 2011/0216936 A1 | 9/2011 | Reed et al. |
| 2011/0219229 A1 | 9/2011 | Cholas et al. |
| 2011/0225427 A1 | 9/2011 | Wood et al. |
| 2011/0235908 A1 | 9/2011 | Ke et al. |
| 2011/0255690 A1 | 10/2011 | Kocher et al. |
| 2011/0261667 A1 | 10/2011 | Ren et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2011/0320627 A1 | 12/2011 | Landow et al. |

(56) References Cited

U.S. PATENT DOCUMENTS

| | | | |
|---|---|---|---|
| 2012/0017091 A1 | 1/2012 | Petrovic et al. | |
| 2012/0023595 A1 | 1/2012 | Speare et al. | |
| 2012/0026393 A1 | 2/2012 | Petrovic et al. | |
| 2012/0072729 A1 | 3/2012 | Winograd et al. | |
| 2012/0072730 A1 | 3/2012 | Winograd et al. | |
| 2012/0072731 A1 | 3/2012 | Winograd et al. | |
| 2012/0084870 A1 | 4/2012 | Petrovic | |
| 2012/0102304 A1 | 4/2012 | Brave | |
| 2012/0122429 A1* | 5/2012 | Wood et al. | 455/414.1 |
| 2012/0129547 A1 | 5/2012 | Andrews, III et al. | |
| 2012/0130719 A1 | 5/2012 | Petrovic et al. | |
| 2012/0203556 A1 | 8/2012 | Villette et al. | |
| 2012/0203734 A1 | 8/2012 | Spivack et al. | |
| 2012/0216236 A1* | 8/2012 | Robinson et al. | 725/118 |
| 2012/0265735 A1 | 10/2012 | McMillan et al. | |
| 2012/0272012 A1 | 10/2012 | Aronovich et al. | |
| 2012/0272327 A1 | 10/2012 | Shin et al. | |
| 2012/0300975 A1* | 11/2012 | Chalamala et al. | 382/100 |
| 2012/0300977 A1 | 11/2012 | Petrovic et al. | |
| 2012/0304206 A1 | 11/2012 | Roberts et al. | |
| 2012/0308071 A1 | 12/2012 | Ramsdell et al. | |
| 2013/0007462 A1 | 1/2013 | Petrovic et al. | |
| 2013/0011006 A1 | 1/2013 | Petrovic et al. | |
| 2013/0031579 A1 | 1/2013 | Klappert | |
| 2013/0060837 A1 | 3/2013 | Chakraborty et al. | |
| 2013/0073065 A1 | 3/2013 | Chen et al. | |
| 2013/0108101 A1 | 5/2013 | Petrovic et al. | |
| 2013/0114847 A1 | 5/2013 | Petrovic et al. | |
| 2013/0114848 A1 | 5/2013 | Petrovic et al. | |
| 2013/0117570 A1 | 5/2013 | Petrovic et al. | |
| 2013/0117571 A1 | 5/2013 | Petrovic et al. | |
| 2013/0129303 A1 | 5/2013 | Lee et al. | |
| 2013/0132727 A1 | 5/2013 | Petrovic | |
| 2013/0142382 A1 | 6/2013 | Petrovic et al. | |
| 2013/0151855 A1 | 6/2013 | Petrovic et al. | |
| 2013/0151856 A1 | 6/2013 | Petrovic et al. | |
| 2013/0152210 A1 | 6/2013 | Petrovic et al. | |
| 2013/0283402 A1 | 10/2013 | Petrovic | |
| 2013/0339029 A1 | 12/2013 | Petrovic et al. | |
| 2014/0029786 A1 | 1/2014 | Winograd | |
| 2014/0067950 A1 | 3/2014 | Winograd | |
| 2014/0071342 A1 | 3/2014 | Winograd et al. | |
| 2014/0074855 A1 | 3/2014 | Zhao et al. | |
| 2014/0075465 A1 | 3/2014 | Petrovic et al. | |
| 2014/0075466 A1 | 3/2014 | Zhao | |
| 2014/0075469 A1 | 3/2014 | Zhao | |
| 2014/0229963 A1 | 8/2014 | Petrovic et al. | |
| 2014/0237628 A1 | 8/2014 | Petrovic | |
| 2014/0267907 A1 | 9/2014 | Downes et al. | |
| 2014/0270337 A1 | 9/2014 | Zhao et al. | |
| 2014/0270338 A1 | 9/2014 | Zhao et al. | |
| 2014/0279296 A1 | 9/2014 | Petrovic et al. | |
| 2014/0279549 A1 | 9/2014 | Petrovic et al. | |
| 2014/0325550 A1 | 10/2014 | Winograd et al. | |
| 2014/0325673 A1 | 10/2014 | Petrovic | |
| 2014/0355817 A1 | 12/2014 | Wong et al. | |
| 2014/0376723 A1 | 12/2014 | Petrovic | |
| 2015/0016228 A1 | 1/2015 | Petrovic et al. | |
| 2015/0016663 A1 | 1/2015 | Tehranchi et al. | |
| 2015/0036873 A1 | 2/2015 | Petrovic et al. | |
| 2015/0121534 A1 | 4/2015 | Zhao et al. | |

FOREIGN PATENT DOCUMENTS

| | | |
|---|---|---|
| CN | 1556987 | 12/2004 |
| CN | 101001354 | 7/2007 |
| EP | 282734 A1 | 9/1988 |
| EP | 372601 A1 | 6/1990 |
| EP | 581317 A2 | 2/1994 |
| EP | 1137250 A1 | 9/2001 |
| EP | 2166725 A1 | 3/2010 |
| EP | 2605485 | 6/2013 |
| EP | 2653964 | 10/2013 |
| EP | 2782337 | 9/2014 |
| GB | 2260246 A | 4/1993 |
| GB | 2292506 A | 2/1996 |
| GB | 2358313 | 7/2001 |
| GB | 2363027 A | 12/2001 |
| JP | 10-150548 A | 6/1998 |
| JP | 11-086435 A | 3/1999 |
| JP | 11-284516 A | 10/1999 |
| JP | 11-346302 A | 12/1999 |
| JP | 2000-069273 | 3/2000 |
| JP | 2000083159 | 3/2000 |
| JP | 2000-174628 | 6/2000 |
| JP | 2000163870 | 6/2000 |
| JP | 2000216981 | 8/2000 |
| JP | 2001022366 | 1/2001 |
| JP | 2001-119555 | 4/2001 |
| JP | 2001175270 | 6/2001 |
| JP | 2001-188549 | 7/2001 |
| JP | 2001-216763 | 8/2001 |
| JP | 2001-218006 | 8/2001 |
| JP | 2001245132 A | 9/2001 |
| JP | 2001257865 | 9/2001 |
| JP | 2001-312570 A | 11/2001 |
| JP | 2001-527660 A | 12/2001 |
| JP | 2001339700 | 12/2001 |
| JP | 2002-010057 A | 1/2002 |
| JP | 2002-024095 A | 1/2002 |
| JP | 2002-027223 A | 1/2002 |
| JP | 2002-091465 A | 3/2002 |
| JP | 2002091712 A | 3/2002 |
| JP | 2002100116 A | 4/2002 |
| JP | 2002125205 A | 4/2002 |
| JP | 2002135557 A | 5/2002 |
| JP | 2002-165191 A | 6/2002 |
| JP | 2002176614 A | 6/2002 |
| JP | 2002-519916 A | 7/2002 |
| JP | 2002-232693 A | 8/2002 |
| JP | 2002232412 A | 8/2002 |
| JP | 2002319924 A | 10/2002 |
| JP | 2002354232 A | 12/2002 |
| JP | 2003-008873 A | 1/2003 |
| JP | 2003-039770 A | 2/2003 |
| JP | 2003-091927 A | 3/2003 |
| JP | 2003134461 | 5/2003 |
| JP | 2003-230095 A | 8/2003 |
| JP | 2003-244419 A | 8/2003 |
| JP | 2003-283802 A | 10/2003 |
| JP | 2003316556 A | 11/2003 |
| JP | 2003348324 | 12/2003 |
| JP | 2004-023786 A | 1/2004 |
| JP | 2004070606 A | 3/2004 |
| JP | 2004-163855 A | 6/2004 |
| JP | 2004173237 A | 6/2004 |
| JP | 2004-193843 A | 7/2004 |
| JP | 2004194233 A | 7/2004 |
| JP | 2004-328747 A | 11/2004 |
| JP | 2005051733 A | 2/2005 |
| JP | 2005-094107 A | 4/2005 |
| JP | 2005525600 A | 8/2005 |
| JP | 20080539669 | 11/2008 |
| JP | 20100272920 | 12/2010 |
| JP | 5283732 | 7/2013 |
| KR | 1020080087047 | 9/2008 |
| KR | 20100009384 A | 1/2010 |
| KR | 1020120128149 | 11/2012 |
| WO | 94-10771 | 5/1994 |
| WO | 95-14289 | 5/1995 |
| WO | 97-09797 | 3/1997 |
| WO | 97-33391 | 9/1997 |
| WO | 98-53565 | 11/1998 |
| WO | 99-03340 | 1/1999 |
| WO | 99-39344 | 5/1999 |
| WO | 99-45706 | 10/1999 |
| WO | 99-62022 | 12/1999 |
| WO | 00-00969 | 1/2000 |
| WO | 00-13136 | 3/2000 |
| WO | 00-56059 | 9/2000 |
| WO | 01-54035 | 7/2001 |
| WO | 0150665 | 7/2001 |
| WO | 01-55889 | 8/2001 |

(56) References Cited

FOREIGN PATENT DOCUMENTS

| WO | 0197128 A1 | 12/2001 |
|---|---|---|
| WO | 0213138 | 2/2002 |
| WO | 0219589 A1 | 3/2002 |
| WO | 0223883 A2 | 3/2002 |
| WO | 0249363 A1 | 6/2002 |
| WO | 02095727 A1 | 11/2002 |
| WO | 2003052598 A1 | 6/2003 |
| WO | 03102947 | 12/2003 |
| WO | 2005017827 A1 | 2/2005 |
| WO | 2005-027501 | 3/2005 |
| WO | 2005038778 A1 | 4/2005 |
| WO | 2006051043 A1 | 5/2006 |
| WO | 2006116394 A2 | 11/2006 |
| WO | 2009031082 | 3/2009 |
| WO | 2010073236 A1 | 7/2010 |
| WO | 2010135687 | 11/2010 |
| WO | 2011116309 | 9/2011 |
| WO | 2013067439 A1 | 5/2013 |
| WO | 2013090462 A1 | 6/2013 |
| WO | 2013090466 A1 | 6/2013 |
| WO | 2013090467 A1 | 6/2013 |
| WO | 2013163921 | 11/2013 |
| WO | 2014144101 | 9/2014 |
| WO | 2014153199 | 9/2014 |
| WO | 2014160324 | 10/2014 |
| WO | 2015013419 | 1/2015 |

OTHER PUBLICATIONS

Yeung, M. M., et al., "An invisible watermarking technique for image verification," Image Processing, International Conference Proceedings, 2:680-683, Oct. 26-29, 1997.
Zhao, J., "A WWW service to embed and prove digital copyright watermarks," Proc. European Conf. on Multimedia Applications, Services and Techniques (ECMAST96), May 1996 (15 pages).
Zhao, J., "Applying digital watermarking techniques to online multimedia commerce," Proc. Int. Conf. on Imaging Science, Systems and Applications (CISSA'97), Jun./Jul. 1997 (7 pages).
International Search Report and Written Opinion dated Sep. 26, 2008 for International Application No. PCT/US2007/016812, filed Jul. 25, 2007 (6 pages).
International Search Report and Written Opinion dated Mar. 18, 2013 for International Application No. PCT/US2012/063431, filed Nov. 2, 2012 (10 pages).
Jacobsmeyer, J., et al., "Introduction to error-control coding," Pericle Communications Company, 2004 (16 pages).
Kalker, T., et al., "A security risk for publicly available watermark detectors," Proc. Benelux Info. Theory Symp., Veldhoven, The Netherlands, May 1998 (7 pages).
Kalker, T., et al., "System issues in digital image and video watermarking for copy protection," Proc. IEEE Int. Conf. on Multimedia Computing and Systems, pp. 562-567, Jun. 1999.
Kang, X., et al., "A DWT-DFT composite watermarking scheme robust to both affine transform and JPEG; compression," IEEE Transactions on Circuits and Systems for Video Technology, 8(13):776-786 Aug. 2003.
Kim, T.Y., et al., "An asymmetric watermarking system with many embedding watermarks corresponding to one detection watermark," IEEE Signal Processing Letters, 3(11):375-377, Mar. 2004.
Kirovski, D., et al., "Multimedia content screening using a dual watermarking and fingerprinting system," Proceedings of the tenth ACM international conference, pp. 372-381, 2002.
Kirovski, D., et al., "Randomizing the replacement attack," ICASSP, pp. 381-384, 2004.
Kirovski, D., et al., "Robust spread-spectrum audio watermarking," IEEE International Conference on Acoustics, Speech, and Signal Processing, 3:1345-1348, 2001.
Kirovski, D., et al., "Multimedia content; screening using a dual watermarking and fingerprinting system," Multimedia '02 Proceedings of the tenth ACM international conference on Multimedia, 2002 (11 pages).

Kocher, P., et al., "Self-Protecting Digital Content: A Technical Report from the CRI Content Security Research Initiative," Cryptography Research, Inc. (CRI), 2002-2003 (14 pages).
Kutter, M., et al., "The watermark copy attack," Proc. of the SPIE: Security and Watermarking of Multimedia Content II, 3971:1-10, Jan. 2000.
Kuznetsov, A.V., et al., "An error correcting scheme for defective memory," IEEE Trans. Inf. Theory, 6(4):712-718, Nov. 1978 (7 pages).
Lacy, J., et al., "Intellectual property protection systems and digital watermarking," Proceedings: Information Hiding, Second International Workshop, Portland, Oregon, pp. 158-168, 1998.
Lin, E.T., et al., "Detection of image alterations using semi-fragile watermarks," Proceedings of the SPIE International Conference on Security and Watermarking of Multimedia Contents II, Jan. 2000 (12 pages).
Lin, P.L., et al., "Robust transparent image watermarking system with spatial mechanisms," The Journal of Systems and Software, 50:107-116, Feb. 2000.
Lotspeich, J., "The Advanced Access Content System's Use of Digital Watermarking," MCPS '06, Oct. 28, 2006, pp. 19-21.
Lu, C.S., et al., "Oblivious cocktail watermarking by sparse code shrinkage: A regional-and global-based scheme," IEEE Transactions on Multimedia, 4(2):209-224, Dec. 2000.
Maehara, F., et al., "A proposal of multimedial home education terminal system based on flash-squeak OS," Technical report of the institute of image information and television engineers, 28(43):Jul. 21-24, 2004.
Mason, A. J., et al., "User requirements for watermarking in broadcast applications," IEEE Conference Publication, International Broadcasting Convention (BC 2000), Amsterdam, Sep. 8-12, 2000 (7 pages).
Mintzer, F., et al., "If one watermark is good, are more better?," Acoustics, Speech, and Signal Processing, ICASSP, 4:2067-2069, Mar. 1999.
Mobasseri, B.G., et al. "Content authentication and tamper detection in digital video," Image Processing Proceedings, International Conference, 1:458-461, 2000.
Moulin, P., et al., "Detection-theoretic analysis of desynchronization attacks in watermarking, " Technical Report MSR-TR-2002-24, Microsoft Corporation, Mar. 2002.
Muranoi, R., et al., "Video retrieval method using shotID for copyright protection systems," Proc. SPIE Multimedia Storage and Archiving Systems III, 3527:245-252, Nov. 1998.
Nikolaidis, N., et al., "Watermark detection: benchmarking perspectives," 2002 IEEE Conference on Multimedia and Expo, 2002 (4 pages).
Office Action dated Jul. 21, 2011 for Japanese Patent Application No. 2008-508985 (6 pages).
Office Action dated Mar. 16, 2012 for Japanese Patent Application No. 2008-508985 (8 pages).
Office Action dated Mar. 18, 2011 for European Patent Application No. 03774648.4 (6 pages).
Office Action dated May 8, 2012 for Japanese Patent Application No. 2009-522802 (4 pages).
Office Action dated Nov. 26, 2012 for Japanese Patent Application No. 2011-114667 (8 pages).
Office Action dated May 1, 2013 for Japanese Patent Application No. 2011-114667 (6 pages).
Office Action dated Nov. 28, 2012 for Japanese Patent Application No. 2011-114666 (8 pages).
Park, J.H., et al., "Robust and fragile watermarking techniques for documents using bidirectional diagonal profiles," Information and Communications Security: Third International Conference, Xian, China, Nov. 2001, pp. 483-494.
Perez-Gonzalez, F., et al., "Approaching the capacity limit in image watermarking a perspective on coding techniques for data hiding applications," Signal Processing, 6(81):1215-1238 Jun. 2001.
Petitcolas, F., et al., "The blind pattern matching attack on watermark systems," IEEE Trans. Signal Processing, Apr. 2003 (4 pages).
Petitcolas, F.A.P., et al., "Attacks on copyright marking systems," Second Workshop on Information Hiding, Lecture Notes in Computer Science, Portland, Oregon, pp. 218-238, Apr. 1998.

(56) References Cited

OTHER PUBLICATIONS

Philips Research Liquid Audio Fraunhofer Institute, "Digital Audio Screening Technology for Phased Rollout," Version 1.00, May 1999 (38 pages).
Pytlak, J.,"Anti-piracy coding," URL: http://www.tele.com/pipermail/tig/2003-November/003842.html; Nov. 2003 (2 pages).
RSA Laboratories, "Frequently asked questions about today's cryptography," Version 4.1, May 2000 (37 pages).
Schneier, B., "Applied cryptography, second edition: protocols, algorithms and source code in C," Oct. 1995 (10 pages).
Seok, J., et al., "A novel audio watermarking algorithm for copyright protection of digital audio," ETRI Journal, 24(3):181-189, Jun. 2002.
Shih, F.Y., et al., "Combinational, image watermarking in the spatial and frequency domains," Pattern Recognition, 36:696-975, May 2002.
Solanki, K., et al., "Robust image-adaptive data hiding: modeling, source coding and channel coding", 41st Allerton Conference on Communications, Control and Computing, Oct. 2003 (10 pages).
Steinebach, M., et al., "StirMark benchmark: audio watermarking attacks," International Conference on Information Technology: Coding and Computing (ITCC 2001), Las Vegas, Nevada, Apr. 2001 (6 pages).
Tanaka, K., et al., "Secret transmission method of character data in motion picture communication," SPIE Visual Communications and Image Processing '91, 1605:646-649, 1991.
Tsai, M.J., et al., "Wavelet packet and adaptive spatial transformation of watermark for digital image authentication," IEEE Image Processing, 2000 International Conference, 1:450-453, 2000 (4 pages).
Verance Corporation, "Confirmedia," PowerPoint presentation made to National Association of Broadcasters; Apr. 24, 2001 (40 pages).
Wolfgang, R., et al., "Perceptual watermarks for digital images and video," Proceedings of the IEEE, 87 (7):1108-1126, Jul. 1999.
Xu, C., et al., "Applications of digital watermarking technology in audio signals," Journal of Audio Eng. Soc., 10 (47):805-812, Oct. 1999.
"Advanced Access Content System (AACS), Pre-recorded Video Book," Revision 0.951, Sep. 2009 (86 pages).
"Content Protection—Self Protecting Digital Content," http://www.cryptography.com/technology/spdc/index.html, May 2010 (1 page).
"Microsoft response to CfP for technology solutions to screen digital audio content for LCM acceptance," Microsoft Corporation, May 23, 1999 (9 pages).
"Task AC122—copy protection for distribution services," http://acad.bg/WISE/english/rd/partners/acts/areal/ac122-t.html, Jul. 1, 1997 (2 pages).
Adelsbach, A., et al., "Proving Ownership of Digital Content," Proc. 3rd Int. Workshop on Information Hiding, 1768:117-133, Sep. 1999.
Aggarwal, A., et al., "Multi-Layer Grid Embeddings," Foundations of Computer Science, 26th Annual Symposium on Foundations of Computer Science, 85:186-196, Oct. 1985.
Aris Technologies, Inc. "Audio Watermarking System to Screen Digital Audio Content for LCM Acceptance," May 1999 (17 pages).
Bangaleea, R., et al., "Performance improvement of spread spectrum spatial-domain watermarking scheme through diversity and attack characterisation," IEEE Africon, pp. 293-298, 2002.
Barreto, P.S.L.M., et al. "Toward Secure Public-Key Blockwise Fragile Authentication Watermarking," IEEE Proceedings Vision, Image, and Signal Processing, 149(2):57-62, Apr. 2002.
Boney, L., et al., "Digital Watermarks for Audio Signals," Dept. of Electrical Engineering, Univ. of Minnesota, Mar. 1996 (4 pages).
Cappellini, V., et al. "Robust Frame-based Watermarking for Digital Video," Proceedings of the 12th International Workshop on Database and Expert Systems Applications, Sep. 2001 (5 pages).
Caronni, G., "Assuring Ownership Rights for Digital Images," Proceedings of reliable IT systems VIS 95, Vieweg Publishing Company, Germany, 1995 (10 pages).
Chen, B. et al., "Quantization index modulation: a class of provably good methods for digital watermarking and information embedding," IEEE Transactions on Information Theory, 47(4):1423-1443 May 2001.
Chou, J., et al., "A Robust Blind Watermarking Scheme based on Distributed Source Coding Principles," Multimedia! 2000 Proceedings of the eighth ACM international conference on multimedia, Los Angeles, California, 2000 (8 pages).
Chou, J., et al., "A Robust Optimization Solution to the Data Hiding Problem using Distributed Source Coding Principles," Pro. SPIE, 3971, San Jose, California, Jan. 2000 (10 pages).
Cinea, Inc., "Forensic watermarking deterring video piracy," 2004, (9 pages). [http://www.cinea.com/whitepapers/forensic_watermarking.pdf].
Costa, M., "Writing on Dirty Paper," IEEE Trans. on Info. Theory, 29(3):439-441, May 1983.
Cox, I. J., et al., "Some general methods for tampering with watermarks," IEEE Journal on Selected Areas in Communications, 16(4): 587-593, May 1998.
Coxford, A., et al., "Advanced Mathematics: A Preparation for Calculus, Second Edition," Harcourt Brace Jovanovish, Inc., 1978 (14 pages).
Das, et al., "Distributed Priority Queues on Hybercube Architectures," IEEE, 1996, pp. 620-627.
Davidson, M.F., "Music File Filter," Sony Music, New York, May 23, 1999 (2 pages).
Digimarc Corporation, "Digimarc Watermarking Guide," 1999 (22 pages).
Dittmann, J., "Combining digital watermarks and collusion secure fingerprints for customer copy monitoring," Proc. IEEE Seminar on Secure Images and Image Authentication, Apr. 2000 (6 pages).
Dittmann, J., et al., "Combining digital watermarks and collusion secure fingerprints for digital images," Proc. SPIE 3657:171-182, Jan. 1999 (12 pages).
Epp, L.W., et al., "Generalized scattering matrices for unit cell characterization of grid amplifiers and device de-embedding," IEEE, 2:1288-1291, Jun. 1995.
European Search Report dated Apr. 12, 2012 for European Patent Application No. 07836262.1 filed Jul. 25, 2007 (12 pages).
European Search Report dated Jul. 3, 2012 for European Patent Application No. 12150742.0, filed Oct. 7, 2003 (5 pages).
European Search Report dated Nov. 10, 2010 for European Patent Application No. 03774648.4, filed Oct. 7, 2003 (5 pages).
European Search Report dated Oct. 24, 2012 for European Patent Application No. 06758537.2, filed Apr. 21, 2006 (6 pages).
European Search Report dated Oct. 31, 2012 for European Patent Application No. 06758577.8, filed Apr. 25, 2006 (6 pages).
European Search Report dated Nov. 8, 2012 for European Patent Application No. 06785709.4, filed Jun. 27, 2006 (5 pages).
Furon, T., et al., "An asymmetric watermarking method," IEEE Trans. Signal Processing, 4(51):981-995, Apr. 2003.
Guth H J. et al., "Error-and collusion-secure fingerprinting for digital data," Proc. 3rd Int. Workshop on Information Hiding, LNCS 1768:134-145, Sep./Oct. 1999.
Hartung, F., et al., "Digital watermarking of MPEG-2 coded video in the bitstream domain," Proc. IEEE Int. Conf. on Acoustics, Speech and Signal Processing, 4:2621-2624, Apr. 1997.
Hartung, F., et al., "Watermarking of MPEG-2 encoded video without decoding and re-coding," Proc. SPIE Multimedia Computing and Networking 97, 3020:264-274, Feb. 1997.
Hartung, F., et al., "Watermarking of uncompressed and compressed video," Signal Processing, 3(66):283-301, May 1998.
Heegard, C., et al., "On the capacity of computer memory with defects," IEEE Trans. Info. Theory, 5(IT-29):731-739, Sep. 1983.
International Search Report and Written Opinion dated Apr. 8, 2013 for International Application No. PCT/US2012/069306, filed Dec. 12, 2012 (12 pages).
International Search Report and Written Opinion dated Mar. 25, 2013 for International Application No. PCT/US2012/069302, filed Dec. 12, 2012 (22 pages).
International Search Report and Written Opinion dated Apr. 24, 2012 for International Application No. PCT/US2011/051857, filed Sep. 15, 2011 (9 pages).
International Search Report and Written Opinion dated Aug. 14, 1998 for International Application No. PCT/US1998/009587, filed May 12, 1998 (3 pages).

(56) References Cited

OTHER PUBLICATIONS

International Search Report and Written Opinion dated Aug. 22, 2007 for International Application No. PCT/US2006/031267, filed Aug. 9, 2006 (2 pages).
International Search Report and Written Opinion dated Feb. 14, 2002 for International Application No. PCT/US2001/026505, filed Aug. 27, 2001 (2 pages).
International Search Report and Written Opinion dated Feb. 28, 2013 for International Application No. PCT/US2012/066138, filed Nov. 20, 2012 (11 pages).
International Search Report and Written Opinion dated Jan. 4, 2008 for International Application No. PCT/US2006/015615, filed Apr. 25, 2006 (5 pages).
International Search Report and Written Opinion dated Mar. 14, 2013 for International Application No. PCT/US2012/069308, filed Dec. 12, 2012 (10 pages).
International Search Report and Written Opinion dated Mar. 28, 2012 for International Application No. PCT/US2011/051855, filed Sep. 15, 2011 (8 pages).
International Search Report and Written Opinion dated May 13, 2008 for International Application No. PCT/US2006/025090, filed Jun. 27, 2006 (2 pages).
International Search Report and Written Opinion dated May 19, 2004 for International Application No. PCT/US2003/031816, filed Apr. 29, 2004 (3 pages).
International Search Report and Written Opinion dated May 29, 2008 for International Application No. PCT/US2006/015410, filed Apr. 21, 2006 (6 pages).
"ATSC-3.0 Automatic Content Recognition Watermarking Solutions," ATSC Technology Group, Advanced Television Systems Committee, Inc., Jan. 2014 (6 pages).
"Civolution's 2nd screen synchronisation solution wins CSI product of the year 2011 award at IBC," IBC Press Release, Hall 2—Stand C30, Sep. 2011 (2 pages).
"Red Bee and Civolution develop companion app for FX UK," http://www.digitaltveurope.net/19981/red-bee-and-civolution-develop-companion-app-for-fx-uk, Jan. 2012 (2 pages).
Baudry, S., et al., "Estimation of geometric distortions in digital watermarking," IEEE International Conference on Watermarking, (2):885-888, Sep. 2002.
European Search Report dated Oct. 14, 2014 for European Patent Application No. 14173053.1, filed Oct. 7, 2003 (5 pages).
European Search Report dated Apr. 23, 2015 for European Patent Application No. 12846172.0, filed Nov. 2, 2012 (8 pages).
European Search Report dated May 28, 2015 for European Patent Application No. 11825990.2, filed Sep. 15, 2011 (6 pages).
European Search Report dated May 29, 2015 for European Patent Application No. 11825992.8 filed Sep. 15, 2011 (6 pages).
International Search Report and Written Opinion dated May 28, 2015 for International Application No. PCT/US2015/020282, filed Mar. 12, 2015 (7 pages).
International Search Report and Written Opinion dated May 1, 2015 for International Application No. PCT/US2014/052973, filed Aug. 27, 2014 (16 pages).
International Search Report and Written Opinion dated Sep. 12, 2014 for International Application No. PCT/US2014/035474, filed Apr. 25, 2014 (17 pages).
International Search Report and Written Opinion dated Sep. 15, 2014 for International Application No. PCT/US2014/035539, filed Apr. 25, 2014 (16 pages).
International Search Report and Written Opinion dated Aug. 25, 2014 for International Application No. PCT/US2014/029564, filed Mar. 14, 2014 (10 pages).
International Search Report and Written Opinion dated Aug. 25, 2013 for International Application No. PCT/US2014/026322, filed Aug. 25, 2014 (12 pages).
International Search Report and Written Opinion dated Aug. 8, 2014 for International Application No. PCT/US2014/028372, filed Mar. 14, 2014 (18 pages).
International Search Report and Written Opinion dated Nov. 11, 2014 for International Application No. PCT/US2014/047840, filed Jul. 23, 2014 (15 pages).
International Search Report and Written Opinion dated Feb. 25, 2015 for International Application No. PCT/US2014/041166, filed Jun. 5, 2014 (10 pages).
Miller, M.L. et al. "Computing the probability of false watermark detection," Published in the Proceedings of the Workshop on Information Hiding, Dresden, Germany, Sep. 29-Oct. 1, 1999.
Miller, M.L. et al. "Informed embedding: exploiting image and detector information during watermark insertion," IEEE Conference Publication, Image Processing, (3)1-4, Sep. 2000.
Office Action dated Dec. 29, 2014 for Chinese Patent Application No. 201180051690.8 (14 pages).
Office Action dated Jan. 20, 2014 for Japanese Patent Application No. 2013-036990 (6 pages).
Office Action dated Oct. 30, 2014 for Korean Patent Application No. 10-2013-7009718 (8 pages).
Office Action dated Mar. 30, 2015 for Korean Patent Application No. 10-2014-7015220 (19 pages).
Office Action dated Feb. 3, 2015 for Chinese Patent Application No. 201180051678.7 (27 pages).
Richenaker, G., "Next generation NP solutions and ENUM," https://www.itu.int/ITU-D/treg/Events/Seminars/2011/Moldova/pdf/Session8_NextGeneration_Solutions.pdf, Neustar Inc., May 2011 (37 pages).
Spangler, T., "Social Science," http://www.multichannel.com/content/social-science, Sep. 2011 (5 pages).
Wang, X, et al., "Robust correlation of encrypted attack traffic through stepping stones by manipulation of interpacket delays," Proceedings of the 10th ACM conference on computer communications security, Oct. 27-30, 2003, Washington D.C., USA.

* cited by examiner

WATERMARK EXTRACTOR ENHANCEMENTS BASED ON PAYLOAD RANKING

FIELD OF INVENTION

The present application generally relates to the field of content management. More particularly, the disclosed embodiments relate to improving extraction of watermarks that are embedded in host contents.

BACKGROUND

This section is intended to provide a background or context to the disclosed embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Watermarks are substantially imperceptible signals embedded into a host content. The host content may be any one of audio, still image, video or any other content that may be stored on a physical medium or transmitted or broadcast from one point to another. Watermarks are designed to carry auxiliary information without substantially affecting fidelity of the host content, or without interfering with normal usage of the host content. For this reason, watermarks are sometimes used to carry out covert communications, where the emphasis is on hiding the very presence of the hidden signals. Other widespread applications of watermarks include prevention of unauthorized usage (e.g., duplication, playing and dissemination) of copyrighted multi-media content, automatic content recognition (ACR), proof of ownership, authentication, tampering detection, content integrity verification, broadcast monitoring, transaction tracking, audience measurement, triggering of secondary activities such as interacting with software programs or hardware components, communicating auxiliary information about the content such as caption text, full title and artist name, or instructions on how to purchase the content, and the like. The above list of applications is not intended to be exhaustive, as many other present and future systems can benefit from co-channel transmission of main and auxiliary information.

Watermark system design involves balancing a number of different requirements, such as imperceptibility, robustness, security, false positive rate, processing load, payload size, etc. In some applications of watermarks, such as copy management applications, the watermarks that are embedded in a host content must often be extracted in consumer products (e.g., media players, copiers, etc.) that access and use the content. As a result of limited computational resources (e.g., memory, real estate on silicon, processing cycles, etc.) available to watermark extractors within such devices, these applications often create challenges in meeting all of the above noted requirements of the watermarking system since an improvement in one requirement often comes at the expense of another requirement. For example, the robustness of watermark extraction (i.e., a measure of how well an extractor can extract embedded watermarks in the presence of noise and other impairments in the host content and/or watermarking channel) can often be improved by increasing the number of extraction attempts at, for example, small offsets from a particular location of interest of the host content. An increase in the number of extraction attempts, however, increases both the processing load on the extractor and the probability of false watermark extractions. As another example, an increase in payload size typically comes at the expense of reduced robustness and/or increased false positive rate.

In should be noted that in the present application, the term "watermark extraction" is used to describe the operations that result in the extraction of a watermark payload, i.e. the bits or symbols of the message carried by the watermark, which is different from removal or erasure of watermarks from the host content. Alternatively, watermark extraction can be called watermark detection, but sometimes watermark detection is used to indicate the detection of the presence of a watermark within a host content without actually extracting the payload carried by that watermark.

SUMMARY

The disclosed embodiments relate to systems, devices, methods and computer program products that improve the detection of watermarks by providing information indicative of a ranking of watermark payloads to watermark extractors.

One aspect of the disclosed embodiments relates to a method that includes receiving a host content at a watermark extractor device and obtaining, at the watermark extractor device, information indicative of a ranking of a plurality of watermark payload values. Such information designates each watermark payload value within a first subset of the plurality of watermark payload values as having an associated rank value. The method further includes based at least in-part on the information indicative of the ranking, configuring the watermark extractor device to prioritize resource allocation for extraction of payload values that are designated as belonging to the first subset over payload values that are not designated as belonging to the first subset, and extracting a payload value from one or more watermarks embedded in the host content. The extracted payload value is one of the payload values designated as belonging to the first subset.

In one exemplary embodiment, prioritizing resource allocation enables extraction of at least one payload value within the first subset with a higher robustness level compared to extraction of any payload value that is not in the first subset. In another exemplary embodiment, prioritizing resource allocation enables extraction of each of the payload values within the first subset with a higher robustness level compared to extraction of each of the payload values within the first subset without the additionally allocated resources. In yet another exemplary embodiment, the ranking comprises a listing of watermark payload values in a particular order of importance. In still another embodiment, the designation as belonging to the first subset is based at least in-part on having a higher likelihood of being extracted compared to watermark payload values that are not in the first subset. The likelihood of being extracted for at least one of the watermark payload values within the first subset is, for example, determine based upon a likelihood of being extracted by other watermark extractor devices.

According to another exemplary embodiment, the designation as belonging to the first subset is based at least in-part on one or more characteristics of the host content. The one or more characteristics can, for example, comprise one or both of: an age or popularity of the host content. In one exemplary embodiment, the designation as belonging to the first subset is based at least in-part on an extent of economic loss associated with unauthorized dissemination of the host content. In still another exemplary embodiment, the designation as belonging to the first subset is based at least in-part on statistics collected regarding one or both of: the host content, or one or more watermark payload values.

In one exemplary embodiment, the designation as belonging to the first subset is based at least in-part on one or more of: a viewing history of a user of the extractor device, a location of a user of the extractor device, a preference of a user of the extractor device, a demographic information of a user of the extractor device, or a behavioral information of a user of the extractor device. In another exemplary embodiment, a count of watermark payload values in the first subset is determined based on a dynamic threshold value that is changeable, thereby allowing designation of a different number of watermark payload values as belonging to the first subset. In yet another exemplary embodiment, the above noted method further includes updating the first subset to include at least one watermark payload value that is different from the watermark payload values before the updating.

In still another exemplary embodiment, configuring the watermark extractor device to prioritize resource allocation includes one or more of: prioritizing usage of a memory resource, prioritizing usage of processing operations, enabling usage of additional watermark payload templates, or enabling usage of additional error correction code templates. In one exemplary embodiment, configuring the watermark extractor device to prioritize resource allocation enables extraction of at least one watermark payload value that is designated as belonging to the first subset with an increased robustness level and with an increased probability of false watermark extractions compared to a watermark payload value that is not designated as belonging to the first subset. In one exemplary embodiment, an expected probability of false watermark extractions for all watermark payload values is not increased. In another exemplary embodiment, the above noted method further comprises allocating additional watermark templates associated with the watermark payload values in the first subset to produce an expanded set of watermark templates, where extracting the payload value comprises comparing a candidate watermark payload value obtained from the host content to all templates in the expanded set of watermark templates to obtain a match to within a predefined error tolerance. In one variation, at least a subset of the expanded set of watermark templates is stored as a look up table (LUT) within the extractor device prior to initiating extraction of the payload value. In another variation, at least a subset of the expanded set of watermark templates is generated on-the-fly, subsequent to initiating extraction of the payload value.

According to one exemplary embodiment, configuring the watermark extractor device to prioritize resource allocation for extraction of payload values that are designated as belonging to the first subset comprises configuring the watermark extractor device to conduct a search for payload values that are designated as belonging to the first subset using template matching operations, where the watermark extractor is configured to conduct a search for payload values that are not designated as belonging to the first subset using non-template-matching error correction code decoding operations. For example, configuring the watermark extractor device to conduct a search for payload values that are designated as belonging to the first subset using template matching operations can include constructing an error correction code watermark payload template for each of the payload values in the first subset.

In another exemplary embodiment, extracting the watermark payload value comprises comparing a candidate watermark payload value obtained from the host content to a plurality of constructed error correction code watermark payload templates corresponding to each of the watermark payload values in the first subset, producing a plurality of error counts, each error count representing a count of mismatched symbols between the candidate watermark payload value and a corresponding constructed error correction code watermark payload template, and identifying, as the extracted watermark payload value, a watermark payload value that corresponds to the smallest error count.

In yet another exemplary embodiment, the above noted method further includes configuring the watermark extractor device to allocate fewer resources for extraction of watermark payload values that are not designated as belonging to the first subset compared to the watermark payload values that are designated as belonging to the first subset. In one exemplary embodiment, the allocated sources for extraction of all payload values is not increased. In another exemplary embodiment, the information indicative of the ranking is obtained from a database located remotely from the extractor device. In still another exemplary embodiment, each of the watermarked payload values is ranked in an order of importance, and configuring the watermark extractor device to prioritize resource allocation comprises allocating more resources for extraction of a payload value that is ranked as being more important within the first subset compared to a payload values that is ranked as being less important within the first subset.

Another aspect of the disclosed embodiments relates to a device that includes a processor, and a memory comprising processor executable code. The processor executable code, when executed by the processor, configures the device to receive a host content, and obtain information indicative of a ranking of a plurality of watermark payload values, where the information designates each watermark payload value within a first subset of the plurality of watermark payload values as having an associated rank value. The processor executable code, when executed by the processor, also configures the device to, based at least in-part on the information indicative of the ranking, configure the device to prioritize resource allocation for extraction of payload values that are designated as belonging to the first subset over payload values that are not designated as belonging to the first subset. The processor executable code, when executed by the processor, further configures the device to extract a payload value from one or more watermarks embedded in the host content, where the extracted payload value is one of the payload values designated as belonging to the first subset.

In one exemplary embodiment, the processor executable code, when executed by the processor, further configures the device to receive new information indicative of the ranking, and modify the first subset in accordance with the new information. In another exemplary embodiment, the processor executable code, when executed by the processor, configures the device to modify the first subset by at least one of: adding a payload value to the first subset that was not previously in the first subset, o removing an existing payload value from the first subset. In still another exemplary embodiment, the processor executable code, when executed by the processor, configures the device to allocate the additional resources including one or more of: prioritizing usage of an additional memory resource, prioritizing usage of additional processing operations, allocating additional watermark payload templates, or allocating additional error correction code templates.

In another exemplary embodiment, the processor executable code, when executed by the processor, further configures the device to allocate additional watermark templates associated with the watermark payload values in the first subset to produce an expanded set of watermark templates. Further, the processor executable code, when executed by the processor, configures the device to extract the payload value by at least in-part comparing a candidate watermark payload value obtained from the host content to all templates in the expanded set of watermark templates to obtain a match to within a predefined error tolerance.

In still another exemplary embodiment, the processor executable code, when executed by the processor, configures the device to conduct a search for payload values that are designated as belonging to the first subset using template matching operations, where the watermark extractor is configured to conduct a search for payload values that are not designated as belonging to the first subset using non-template-matching error correction code decoding operations. In another exemplary embodiment, the processor executable code, when executed by the processor, configures the device to construct an error correction code watermark payload template for each of the payload values in the first subset.

In one exemplary embodiment, the processor executable code, when executed by the processor, configures the device to compare a candidate watermark payload value obtained from the host content to a plurality of constructed error correction code watermark payload templates corresponding to each of the watermark payload values in the first subset, produce a plurality of error counts, each error count representing a count of mismatched symbols between the candidate watermark payload value and a corresponding constructed error correction code watermark payload template, and identify, as the extracted watermark payload value, a watermark payload value that corresponds to the smallest error count. In still another exemplary embodiment, the processor executable code, when executed by the processor, further configures the device to allocate fewer resources for extraction of watermark payload values that are not designated as belonging to the first subset compared to the watermark payload values that are designated as belonging to the first subset.

In another exemplary embodiment a system is provided that includes the above noted device. Such a system further includes a management center comprising a database, where the management center is configured to provide the information indicative of the ranking from the database to the extractor device. Such a system can also include a plurality of additional devices, each of the plurality of additional devices comprising a corresponding watermark extractor device, where the management center is configured to communicate bi-directionally with each of the plurality of additional devices and with the device.

Another aspect of the disclosed embodiments relates to a computer program product, embodied on one or more non-transitory computer readable media. The computer program product includes program code for receiving a host content at a watermark extractor device, and program code for obtaining, at the watermark extractor device, information indicative of a ranking of a plurality of watermark payload values, where the information designates each watermark payload value within a first subset of the plurality of watermark payload values as having an associated rank value. The computer program product also includes program code for, based at least in-part on the information indicative of the ranking, configuring the watermark extractor device to prioritize resource allocation for extraction of payload values that are designated as belonging to the first subset over payload values that are not designated as belonging to the first subset, and program code for extracting a payload value from one or more watermarks embedded in the host content, wherein the extracted payload value is one of the payload values designated as having belonging to the first subset.

Another aspect of the disclosed embodiments relates to a device that includes a receiver configured to receive a host content, and a processor implemented at least in-part in hardware and configured to obtain information indicative of a ranking of a plurality of watermark payload values. Such information designates each watermark payload value within a first subset of the plurality of watermark payload values as having an associated value. The processor is further configured to, based at least in-part on the information indicative of the ranking, configure a watermark extractor component to prioritize resource allocation for extraction of payload values that are designated as belonging to the first subset over payload values that are not designated as belonging to the first subset. The watermark extractor is also configured to extract at least one payload value designated as belonging to the first subset from one or more watermarks that are embedded in the host content.

DETAILED DESCRIPTION OF CERTAIN EMBODIMENTS

Figure 1:
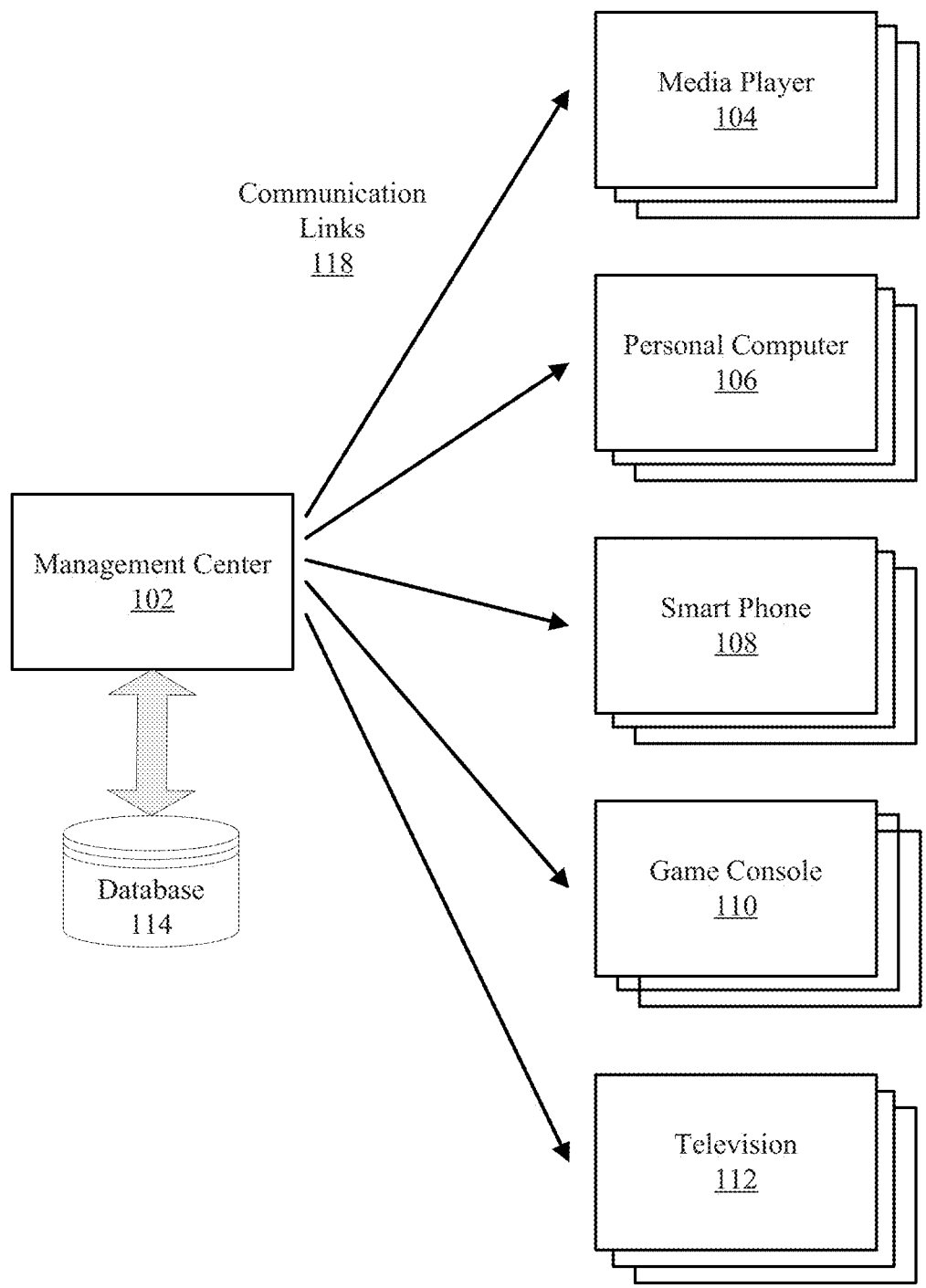
FIG. 1 illustrates a system within which improved watermark extraction using payload ranking can be effectuated in accordance with an exemplary embodiment.

In the following description, fir purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

As noted earlier, watermarks can be used in many different applications such as copy control, forensic marking, or automatic content recognition (ACR). In many of those applications, not all embedded watermark payloads are equally important or equally likely to be encountered by a particular extractor. For example, in ACR applications, where particular types of content, or particular content repositories and websites are examined, a watermark extractor may be provided with some prior knowledge as to which watermark payload values are likely to be presented to it. Such an advanced knowledge of watermark payload values can, for example, be acquired by the watermark extractor using a database that maintains information regarding watermark extractions occurring in other (e.g., similar) extractors. The extractor can then use such information to preferentially allocate more or less resources to extract certain watermark payloads. That is, allocation of resources are prioritized such that more resources are allocated for the extraction of watermark payload values that are designated as having a high rank. Non-limiting examples of such additional resources include additional memory resources, additional processing operations (e.g., computations cycles), additional watermark payload templates and additional error correction code templates. Further details of watermark and error correction code templates are provided in the sections that follow. In some embodiments, the allocation of total resources for the extraction of all watermark payloads remains unchanged (or is not increased) since an increase in allocation of resources for higher ranked payload values can be offset by a reduced allocation of resources for lower ranked payload values. Further, since, in some embodiments, the extraction of higher ranked payloads is more likely, the resources for extraction of lower ranked payloads may not get utilized.

In some embodiments, the designation of payload values as having a high rank value is based at least in-part on an extent of economic loss associated with unauthorized dissemination of the host content. For example, in a copy control watermarking system, a content that includes a "no home use" message as part of its embedded watermark payload often corresponds to a content that is only authorized for presentation in movie theatres. As such, any subsequent encounters with such a movie (e.g., at a file sharing website) should be treated as a movie piracy scenario, which can result in a significant economic loss to the movie studios, movie theatres, actors, and other personnel and entities that are involved in the production and distribution of the movie. In this case, proper extraction of a "no home use" watermark payload is treated as more important than extraction of, for example, a "no Internet redistribution" payload (which could represent unauthorized dissemination of a content that is intended to be only released on DVD).

In some exemplary embodiments, the designation of payload values as having a high rank value is based at least in-part on a contractual agreement that requires a watermark system designer or a system operator to treat particular watermark payloads with higher priority than other payloads.

In some embodiments, an extractor is configured to adjust its operations to conduct watermark extraction based on a received payload ranking information. For example, in one embodiment, an extractor first attempts to extract only those payloads that are most likely to be embedded in the content, and only upon a determination that those payloads cannot be reliably extracted, the extractor conducts further operations to extract less likely payloads. In such a configuration, the processing load is often reduced, since the extractor is more likely to conclude its operations when a likely payload is successfully extracted rather than expending resources in a systematic search of the payload space that includes unlikely watermark payload candidates.

In many applications, a watermarking system is designed based on a predefined maximum false positive rate. If all payloads are treated equally by the extractor, then each candidate watermark payload makes an equal contribution to the overall false positive rate of the watermarking system. On the other hand, when the payloads are ranked in a given priority order, in accordance with the disclosed embodiments, a watermark extractor can be configured to allocate a larger fraction of the overall false positive rate budget to the higher ranked payloads as compared to the lower ranked payloads. This way, the extractor becomes capable of extracting higher ranked codes with a higher robustness and/or at a higher confidence level. In such embodiments, the overall expected false positive rate associated with the extraction of all watermark payload values can remain unchanged (or is not increased) since, through proper allocation of extraction operations and resources, a potentially higher false positive rate for some payload values is offset by a tower false positive rate for other payload values.

Another aspect of the disclosed embodiments related to improving the robustness of watermark extractions for high ranking payloads. In particular, watermark extraction robustness in the presence of various signal distortions can be improved with incorporating additional processing steps in the watermark extraction process. For example, an extractor may attempt to invert (e.g., undo) various potential distortions that are likely to contaminate a particular host content, and then attempt to extract watermarks from both the received host content and the inverted host content. Alternatively, distorted watermark templates (e.g., representations of a watermark payload when the host content is subject to the corresponding distortions) can be provided to the extractor so as to allow the extractor to compare a candidate watermark payload that is extracted from the received content to the distorted watermark templates in search of a match. In both of the above extraction techniques, the chances of extracting a watermark improve by increasing the number of watermark extraction or template matching attempts. Such expanded extraction operations not only allow the search of a larger portion of the watermark extraction space, but they can be designed to enable a search of the extraction space with a finer search granularity. The drawback, however, is an increase in both the processing load and the probability of false watermark extractions.

The techniques of the disclosed embodiments allow an extractor to allocate a larger portion of the false positive rate budget and computational resources to the extraction of higher-ranking payloads, thus allowing more extraction attempts to be directed towards such higher ranking payloads while allocating fewer computational resources (e.g., extraction attempts) to the lower-ranking payloads. As a result, in systems that operate in accordance with such exemplary embodiments of the present application, the total number of processing operations and the probability of false watermark extractions can remain substantially the same as systems where such payload ranking techniques are not utilized. Yet, watermarks that are considered to be more important are extracted with an improved extraction robustness.

By the way of example, and not by limitation, the following provides an illustration of watermark extractor enhancements based on payload ranking for an ACR system. In ACR systems, the embedded watermarks can be used to identify the host content (e.g., a movie, a TV show, a song, an image, etc.). In such systems, watermarks can be used to additionally identify a content distribution channel, such as a theatre where the movie is shown or a broadcast station from which the content is being broadcast. Furthermore, watermarks can be used to identify one or more segments of the content by, for example, incorporating a field (e.g., a counter) into the watermark payload that is sequentially incremented (e.g., once per minute) for the duration of the content. In order to carry all of the above information, the watermark payload needs to be relatively large, e.g. between 20 and 100 bits. Such payload bits are typically linked to the content metadata through a database. For example, each field within the watermark payload can be used as a pointer (or a serial number) that identifies a database entry for the corresponding field.

In an ACR system, payload ranking can be implemented based on a number of different criteria. In one example embodiment, the payloads are ranked based on their likelihood of having been extracted by a similar and/or a same type of device. For example, a list of all extracted watermarks can be constructed for software extractors running on operating system A (i.e., device type A), software extractors running on operating system B (i.e., device type B), hardware extractors running on standalone media handling devices such as DVD players (i.e., device type C), hardware extractors running on integrated media handling devices such as media players incorporated in television sets (i.e., device D), etc. For each type of device, the extracted payload values are counted, and sorted to generate a listing (for each device type) that identifies the most frequently extracted payload as the top ranked payload, followed by the second most frequently extracted payload as the second highest ranked payload, and so on.

Alternatively, payload ranking can be implemented based on one or more characteristics of the host content. In some exemplary embodiments, the ranking is determined based on the age and/or popularity of the host content. For example, higher payload rankings can be assigned to currently broadcast content and lower rankings to older content. In one exemplary embodiment, the assignment of payload rankings is carried out at a database which includes, or can obtain, information regarding the age (e.g., whether the content is being currently broadcast) and/or popularity (e.g., if the content is on a top-50 list or has exceeded certain viewership). Such a database also includes, or can obtain, the payload values that have been embedded in such current or popular content, allowing it to generate a payload ranking list based on the age or popularity criteria, and communicate the ranking to one or more extractors. Additional non-limiting examples of payload ranking criteria includes assigning higher ranks to premium content, pay-per-view content, content belonging to customers with special privileges, etc.

Another aspect of the disclosed embodiments relates to providing a payload ranking technique that is based on the use of error correction codes. Since watermarks can be distorted due to various intentional or unintentional processing operations (e.g., as part of content post-processing, transmission and/or storage), watermark payloads are typically encoded using channel coding techniques that allow correction of error-contaminated symbols. Some examples of well-known error correction/error detection codes include Reed-Solomon codes, BCH codes, LDPC codes, CRCs, etc. An error correction code selected for a watermarking system allows a particular number of symbol errors (e.g., bit errors) to be detected and/or corrected depending on the particular parameters of the error correction code. This error correction/detection capability is obtained by adding parity (or redundancy symbols to each block of data e.g., to each watermark payload) that is to be protected, where a larger number of errors can be corrected resulting in a better watermark resilience to signal distortions) at the expense of an increased payload size. It should be noted that typical forward error correction codes treat all payload values equally during the decoding process.

In some exemplary embodiments, payload ranking is used to modify error correction code decoding operations to improve the detection of embedded watermarks with high ranking payloads. In one exemplary embodiment, a set of watermark templates is provided only for the higher ranking payloads. That is, the appropriate parity symbols (generated based on the particular error correction algorithm of the watermarking system) are appended to each of the higher ranking payloads to form "constructed error correction code (or error detection code) packet, templates" (hereinafter a "constructed ECC templates"). A candidate watermark packet that is extracted from a received content is then compared against all such constructed. ECC templates to determine if a match within a predefined error tolerance is found. Upon a determination that such a match is found, the corresponding payload value is declared as the extracted payload value.

In some exemplary embodiments, the constructed ECC templates are stored in a look-up-table (LUT). Alternatively, or additionally, ECC packet templates can be generated on-the-fly after the initiation of watermark extraction operations (e.g., upon acquisition of a watermark packet candidate).

In some exemplary embodiments related to the ECC constructed templates, such templates are only generated for higher ranking payloads and all other payloads are decoded using conventional (i.e., non-template matching) error correction code decoding techniques. For example, upon a determination that no higher ranking code is extracted, the extractor can make a decision as to whether or not to pursue the detection of lower ranking payloads based on conventional techniques. In these embodiments, the extraction robustness of higher ranking payloads is improved since template matching (e.g., based on LUT decoding or on-the-fly generation of templates) typically allows a higher number of errors to be corrected, while maintaining a substantially similar (e.g., within the same order of magnitude) false positive extraction rate, compared to non-template matching techniques. However, depending on the type of error correction code algorithm and the size of error correction code space, LUT decoding results in consumption of additional memory, while computing the templates on-the-fly increases the processing load of the watermark extractor. Thus, in some implementations, the additional robustness for higher ranking payloads is achieved at the expense of consumption of additional resources. It should be noted that on-the-fly generation of watermark templates typically involves generation of the watermark templates based on an algorithm during the watermark extraction process (e.g., after the extraction process is initiated). Thus, on-the-fly watermark generation means that watermark templates are created as needed and then are erased from memory, which is repeated whenever a new need for watermark templates arises, i.e. many times during an extractor run. In contrast, creating templates as, for example, part of extractor initialization process would only require storing the watermark templates in a LUT, which requires memory resources but not much processing, since the templates are created only once per run.

In a first exemplary embodiment where LUT decoding is carried out, the LUT is created by a database and communicated to the extractors. In a second exemplary embodiment, the higher ranking payloads are selected by the database and communicated to the extractor, but generation of the LUT comprising watermark templates for such higher ranking watermark payloads are conducted at the extractor. In the first exemplary embodiment, through the use of some communication bandwidth between the database and the extractors, processing load of the extractors is reduced, whereas in the second embodiment the opposite holds true. The above two exemplary embodiments (and combinations thereof) illustrate how communication bandwidth between the database and the extractors can be traded off for processing load at the extractor. Such tradeoff considerations can be utilized to implement the disclosed embodiments on a case-by-case basis. For instance, in scenarios where communication bandwidth is at a premium, the second exemplary embodiment may be implemented.

In some exemplary embodiments related to the ECC constructed templates, such templates are generated for all payloads, but the higher ranking payloads are treated preferentially. For example, additional variations of ECC construed templates are generated for only the higher ranking payloads while one (or a limited number) of such templates are generated for the remaining payloads. This way, an expanded search of the extraction payload space (i.e., search of a larger portion of the extraction space and/or search a particular portion of the watermark extraction space with finer granularity) is conducted for only the higher ranking payloads. The generation of ECC constructed templates for all payload values can be particularly useful (or efficient) when the watermark payload size is small, and/or when only a limited number of watermark payloads have been implemented.

In some exemplary embodiments, the list of high ranking payloads is dynamically adjusted. For example, the payload values can change over time as certain payloads gain further importance while other payloads lose their importance. Similarly, the count of high ranking payload values can dynamically change as the list of important payloads shrinks or expands to include fewer or additional payload values. In embodiments that template matching is utilized, a list of watermark templates as well as the associated error thresholds, can be updated dynamically to reflect changes in the ranking of the payloads. These changes can be implemented at the extractor device pursuant to communications with a database that decides which payloads should get preferential treatment during a given period of time and/or which extractors should such information be conveyed to. In deciding which payloads to be treated preferentially, additional considerations can be used, such as viewing history of a particular user, user's location obtained through, for example, its IP address, user provided data regarding the user's preferences, a demographic information of a user of the extractor device, a behavioral information of a user of the extractor device, etc.

FIG. 1 illustrates a system within which improved watermark extraction using payload ranking can be effectuated in accordance with an exemplary embodiment. In FIG. 1, the management center 102 is directly or indirectly in communication with a variety of devices 104 to 112 through one or more communication links 118. In some examples, the communication links are secure links and may be bi-directional. A variety of device authentication and handshaking protocols may be used to establish a secure link between the management center 102 and devices 104 to 112. Such devices can include, for example, media players 104, personal computers 106, smart phones 108, game consoles 110, televisions 112, and other devices that include a media handling device with an associated watermark extractor. The management center 102 includes, or is in communication with, a database 114, which stores information related to payload rankings, watermark and error correction code templates, statistics regarding watermark payloads including the frequency of extraction of particular watermark payloads on particular devices, statistics regarding various host content including their age and popularity, and other information. The management center 102 can also be in communication with other entities and devices (not shown), such as certificate authorities and authorization authorities, or may be part of a larger system of content management and distribution network. The management center 102 also includes one or more processors (not shown) with computational capabilities to process the information received and/or stored at the management center 102, to select various watermark payloads, to compute various thresholds, watermarks and error correction code templates and other parameters or values, at least some of which can be subsequently communicated to one or more of the devices 104 through 112. Although FIG. 1 illustrates a single management center 102, it is understood that the functionality of the management center 102 can be implemented as a distributed system comprising a plurality of connected devices and entities.

Figure 2:
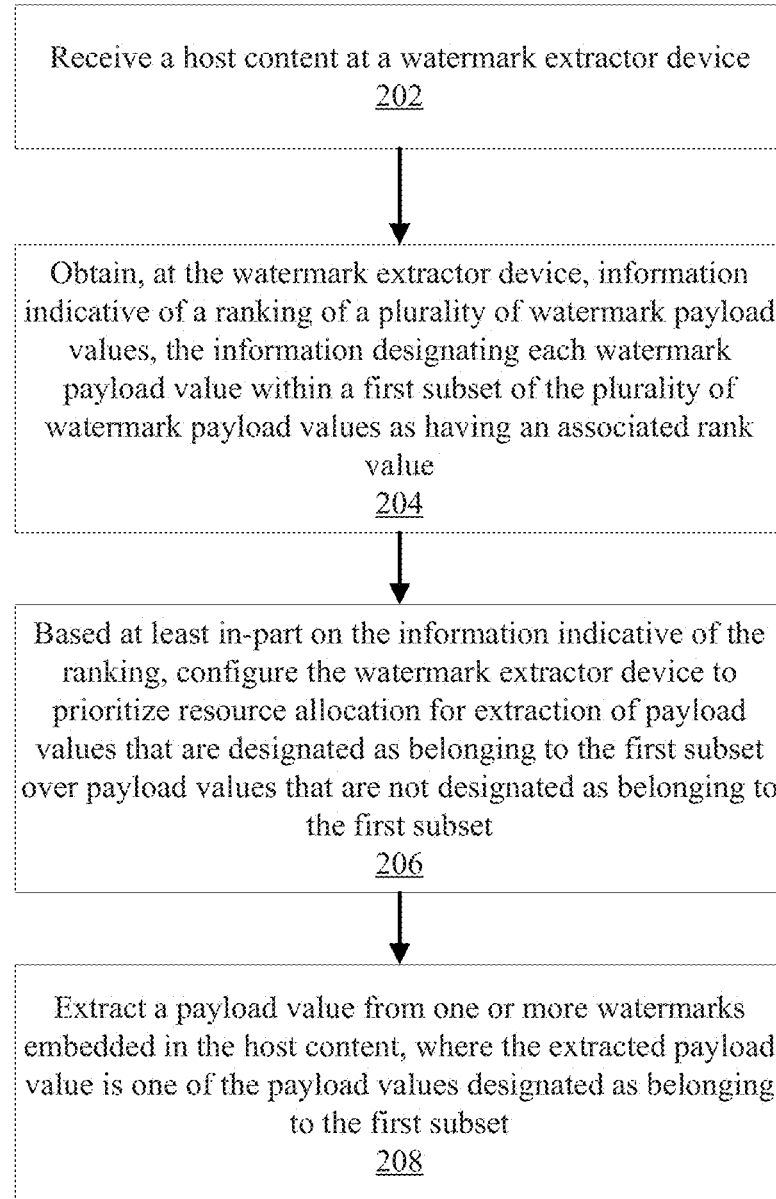
FIG. 2 illustrates a set of operations that can be carried out to improve watermark extraction operations in accordance with an exemplary embodiment.

FIG. 2 illustrates a set of operations that can be carried out to improve watermark extraction operations in accordance with an exemplary embodiment. At 202, a host content is received at an extractor device. Such an extractor device may be a component within a larger device or system, such as a smartphone, a DVD player, a television set and the like. At 204, information indicative of a ranking of a plurality of watermark payload values is obtained. Such information designates a first subset of the plurality of watermark payload values as having an associated rank value. The associated rank value, for example, indicates a ranking tier the corresponding payload that is higher than other watermark payload values not in the first subset. At 206, based, at least in part, on the information indicative of the ranking, the watermark extractor device is configured to prioritize resource allocation for extraction of payload values that are designated as belonging to the first subset over payload values that are not designated as belonging to the first subset. At 208, a payload value is extracted from one or more watermarks embedded in the host content. Such an extracted payload value is one of the payload values designated as belonging to the first subset.

Figure 3:
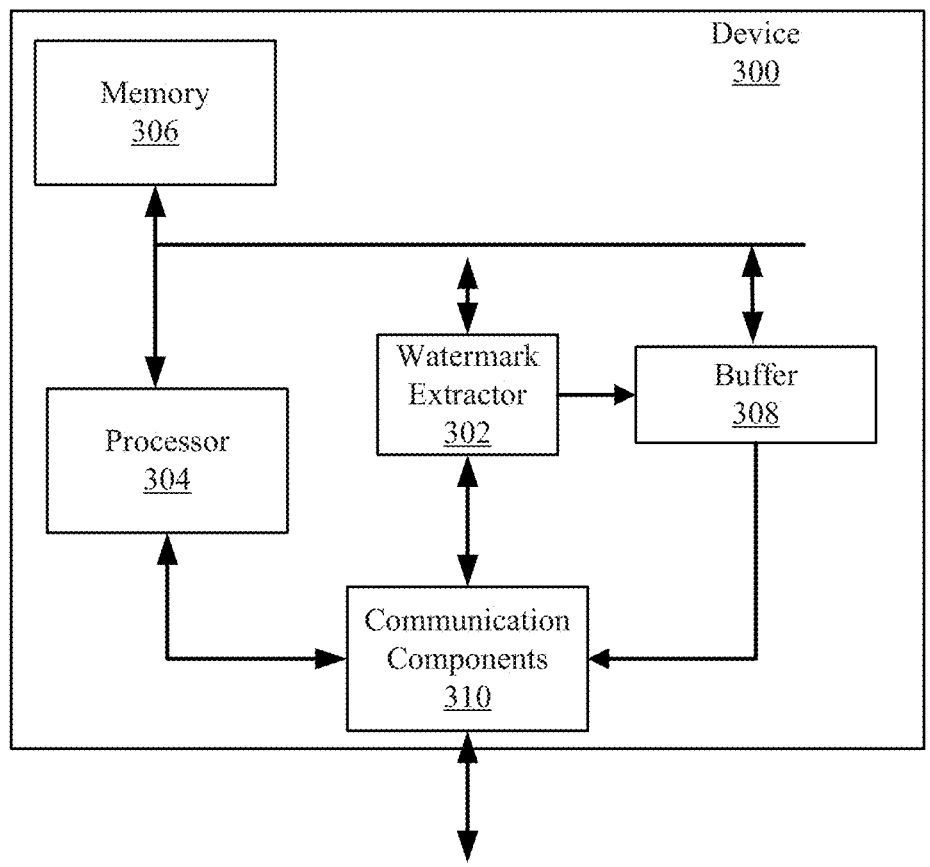
FIG. 3 illustrates a device that can benefit from, and implement, improved watermark extraction based on watermark payload ranking in accordance with an exemplary embodiment.

FIG. 3 illustrates a device 300 that can benefit from, and implement, improved watermark extraction based on watermark payload ranking in accordance with an exemplary embodiment. The device 300 in FIG. 3 includes a watermark extractor 302 that is configured to extract one or more watermark payloads from the watermarks that are embedded in a host content. For example, the watermark extractor 302 can be configured to perform template matching, error correction code decoding, correlation computations, filtering and other operations that are needed to extract the watermark payloads. The communication components 310 in FIG. 3 are configured to enable communication between the device 300 (and its components) and other entities outside of the device 300, and as such, they can include, or be in communication with, the appropriate transmitter and receiver circuitry (e.g., antenna, analog and digital components, etc.) that are needed to carry out wired or wireless transmission of signals. The buffer 308 in FIG. 3 is used for temporary storage of information and intermediate data and parameters during the extraction of watermarks. For example, the buffer 308 can include a look-up-table with watermark templates that are generated either by Management Center 102 in FIG. 1 or by the extractor itself based on the payload ranking information obtained from the Management Center 102. The device 300 in FIG. 3 can also include at least one processor 304 (e.g. a microprocessor) and a memory 306 comprising processor executable code. Such a processor executable code can configure the device to perform various operations, to allocate resources for extraction of payloads with varying degrees of importance. The processor 304 can be also used to, for example, coordinate the operations of other components within the device 300, to initiate transfer of information and data from/to the device 300, and perform other computations. The memory 306 can include additional data and information that may be needed to carry out the watermark extraction operations.

The disclosed embodiments can be implemented using hardware devices that comprise particular physical components. For example, the devices of the present application can be implemented as an application specific integrated circuit (ASIC), as part of a field programmable gate array (FPGA), and/or using digital and analog components and circuitry.

Figure 4:
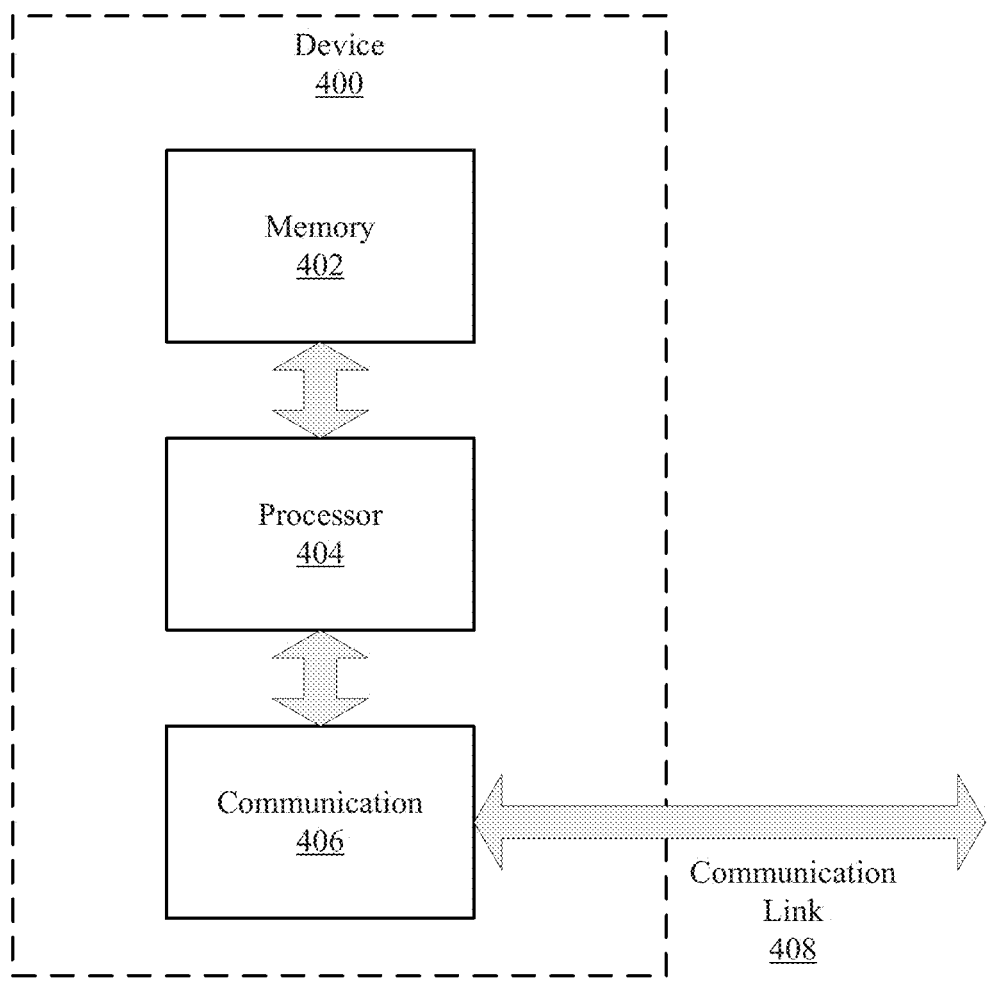
FIG. 4 illustrates a block diagram of a device within which various disclosed embodiments may be implemented.

Certain aspects of the disclosed embodiments can be implemented as a device that includes a processor and a memory comprising processor executable code. The processor executable code, when executed by the processor, configures the device to perform any one of and/or all operations that are described in the present application. For example, FIG. 4 illustrates a block diagram of a device 400 within which various disclosed embodiments may be implemented. The device 400 comprises at least one processor 404 (e.g., a microprocessor) and/or controller, at least one memory 402 unit that is in communication with the processor 404, and at least one communication unit 404 that enables the exchange of data and information, directly or indirectly, through the communication link 408 with other entities, devices, databases and networks. The communication unit 406 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 400 of FIG. 4 may be integrated as part of any of the devices that are shown in FIG. 1, such as part of a device at the management center 102, and any of the devices 104 to 112.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
receiving a host content at a watermark extractor device;
obtaining, at the watermark extractor device, information indicative of a ranking of a plurality of watermark payload values, the information designating each watermark payload value within a first subset of the plurality of watermark payload values as having an associated rank value;
based at least in-part on the information indicative of the ranking, configuring the watermark extractor device to prioritize resource allocation for extraction of payload values that are designated as belonging to the first subset over payload values that are not designated as belonging to the first subset; and
extracting a payload value from one or more watermarks embedded in the host content,
wherein extracting the payload value comprises:
comparing a candidate watermark payload value obtained from the host content to a plurality of constructed error correction code watermark payload templates corresponding to each of the watermark payload values in the first subset,
producing a plurality of error counts, each error count representing a count of mismatched symbols between the candidate watermark payload value and a corresponding constructed error correction code watermark payload template, and
identifying, as the extracted watermark payload value, a watermark payload value that corresponds to the smallest error count, and
wherein the extracted payload value is one of the payload values designated as belonging to the first subset.

2. The method of claim 1, wherein configuring the watermark extractor device to prioritize resource allocation enables extraction of at least one payload value within the first subset with a higher robustness level compared to extraction of any payload value that is not in the first subset.

3. The method of claim 1, wherein configuring the watermark extractor device to prioritize resource allocation enables extraction of each of the payload values within the first subset with a higher robustness level compared to extraction of each of the payload values within the first subset without the additionally allocated resources.

4. The method of claim 1, wherein the ranking comprises a listing of watermark payload values in a particular order of importance.

5. The method of claim 1, wherein the designation as belonging to the first subset is based at least in-part on having a higher likelihood of being extracted compared to watermark payload values that are not in the first subset.

6. The method of claim 5, wherein the likelihood of being extracted for at least one of the watermark payload values within the first subset is determined based upon a likelihood of being extracted by other watermark extractor devices.

7. The method of claim 1, wherein the designation as belonging to the first subset is based at least in-part on one or more characteristics of the host content.

8. The method of claim 7, wherein the one or more characteristics comprise one or both of: an age or popularity of the host content.

9. The method of claim 1, wherein the designation as belonging to the first subset is based at least in-part on an extent of economic loss associated with unauthorized dissemination of the host content.

10. The method of claim 1, wherein the designation as belonging to the first subset is based at least in-part on statistics collected regarding one or both of:
   the host content, or
   one or more watermark payload values.

11. The method of claim 1, wherein the designation as belonging to the first subset is based at least in-part on one or more of:
   a viewing history of a user of the extractor device,
   a location of a user of the extractor device,
   a preference of a user of the extractor device,
   a demographic information of a user of the extractor device, or
   a behavioral information of a user of the extractor device.

12. The method of claim 1, wherein a count of watermark payload values in the first subset is determined based on a dynamic threshold value that is changeable, thereby allowing designation of a different number of watermark payload values as belonging to the first subset.

13. The method of claim 1, further comprising updating the first subset to include at least one watermark payload value that is different from the watermark payload values before the updating.

14. The method of claim 1, wherein configuring the watermark extractor device to prioritize resource allocation includes one or more of:
   prioritizing usage of a memory resource,
   prioritizing usage of processing operations,
   allocating additional watermark payload templates, or
   allocating additional error correction code templates.

15. The method of claim 1, wherein configuring the watermark extractor device to prioritize resource allocation enables extraction of at least one watermark payload value that is designated as belonging to the first subset with an increased robustness level and with an increased probability of false watermark extractions compared to a watermark payload value that is not designated as belonging to the first subset.

16. The method of claim 15, wherein an expected probability of false watermark extractions for all watermark payload values is not increased.

17. The method of claim 1, further comprising allocating additional watermark templates associated with the watermark payload values in the first subset to produce an expanded set of watermark templates, wherein
   extracting the payload value comprises comparing the candidate watermark payload value obtained from the host content to all templates in the expanded set of watermark templates to obtain a match to within a predefined error tolerance.

18. The method of claim 17, wherein at least a subset of the expanded set of watermark templates is stored as a look up table (LUT) within the extractor device prior to initiating extraction of the payload value.

19. The method of claim 17, wherein at least a subset of the expanded set of watermark templates is generated on-the-fly, subsequent to initiating extraction of the payload value.

20. The method of claim 1, wherein configuring the watermark extractor device to prioritize resource allocation for extraction of payload values that are designated as belonging to the first subset comprises:
   configuring the watermark extractor device to conduct a search for payload values that are not designated as belonging to the first subset using non-template-matching error correction code decoding operations.

21. The method of claim 1, further comprising configuring the watermark extractor device to allocate fewer resources for extraction of watermark payload values that are not designated as belonging to the first subset compared to the watermark payload values that are designated as belonging to the first subset.

22. The method of claim 21, wherein allocated resources for extraction of all payload values is not increased.

23. The method of claim 1, wherein the information indicative of the ranking is obtained from a database located remotely from the extractor device.

24. The method of claim 1, wherein: each of the watermarked payload values is ranked in an order of importance; and configuring the watermark extractor device to prioritize resource allocation comprises allocating more resources for extraction of a payload value that is ranked as being more important within the first subset compared to a payload value that is ranked as being less important within the first subset.

25. The method of claim 1, wherein the watermark payload value that corresponds to the smallest error count is identified as the extracted watermark payload value upon a determination that the smallest error count is below a predefined error tolerance value.

26. A device, comprising:
   a processor; and
   a memory comprising processor executable code, the processor executable code, when executed by the processor, configures the device to:
   receive a host content;
   obtain information indicative of a ranking of a plurality of watermark payload values, the information designating each watermark payload value within a first subset of the plurality of watermark payload values as having an associated rank value;
   based at least in-part on the information indicative of the ranking, configure the device to prioritize resource allocation for extraction of payload values that are designated as belonging to the first subset over payload values that are not designated as belonging to the first subset; and
   extract a payload value from one or more watermarks embedded in the host content, wherein extraction of the payload value comprises:
      comparison of a candidate watermark payload value obtained from the host content to a plurality of constructed error correction code watermark payload templates corresponding to each of the watermark payload values in the first subset,
      production of a plurality of error counts, each error count representing count of mismatched symbols between the candidate watermark payload value and a corresponding constructed error correction code watermark payload template, and
      identification, as the extracted watermark payload value, a watermark payload value that corresponds to the smallest error count, and
      wherein the extracted payload value is one of the payload values designated as belonging to the first subset.

27. The device of claim 26, wherein configuring the watermark extractor device to prioritize resource allocation enables extraction of at least one payload value within the first subset with a higher robustness level compared to extraction of any payload value that is not in the first subset.

28. The device of claim 26, wherein configuring the watermark extractor device to prioritize resource allocation enables extraction of each of the payload values within the first subset with a higher robustness level compared to extraction of each of the payload values within the first subset without the additionally allocated resources.

29. The device of claim 26, wherein the ranking comprises a listing of watermark payload values in a particular order of importance.

30. The device of claim 26, wherein the designation as belonging to the first subset is based at least in-part on having a higher a likelihood of being extracted compared to watermark payload values that are not in the first subset.

31. The device of claim 30, wherein the likelihood of being extracted for at least one of the watermark payload values within the first subset is determined based upon a likelihood of being extracted by other devices.

32. The device of claim 26, wherein the designation as belonging to the first subset is based at least in-part on one or more characteristics of the host content.

33. The device of claim 32, wherein the one or more characteristics comprise one or both of: an age or popularity of the host content.

34. The device of claim 26, wherein the designation as belonging to the first subset is based at least in-part on an extent of economic loss associated with unauthorized dissemination of the host content.

35. The device of claim 26, wherein the designation as belonging to the first subset is based at least in-part on statistics collected regarding one or both of:
the host content, or
one or more watermark payload values.

36. The device of claim 26, wherein the designation as belonging to the first subset is based at least in-part on one or more of:
a viewing history of a user of the device,
a location of a user of the device,
a preference of a user of the device,
a demographic information of a user of the extractor device, or
a behavioral information of a user of the extractor device.

37. The device of claim 26, wherein the processor executable code, when executed by the processor, further configures the device to:
receive new information indicative of the ranking; and
modify the first subset in accordance with the new information.

38. The device of claim 26, wherein the processor executable code, when executed by the processor, configures the device to modify the first subset by at least one of:
adding a payload value to the first subset that was not previously in the first subset, or
removing an existing payload value from the first subset.

39. The device of claim 26, the processor executable code, when executed by the processor, configures the device to prioritize resource allocation by including one or more of:
prioritizing usage of a memory resource,
prioritizing usage of processing operations,
allocating additional watermark payload templates, or
allocating additional error correction code templates.

40. The device of claim 26, wherein configuring the device to prioritize resource allocation enables extraction of at least one watermark payload value that is designated as belonging to the first subset with an increased robustness level and with an increased probability of false watermark extractions compared to a watermark payload value that is not designated as belonging to the first subset.

41. The device of claim 40, wherein an expected probability of false watermark extractions for all watermark payload values remains unchanged.

42. The device of claim 26, wherein:
the processor executable code, when executed by the processor, further configures the device to allocate additional watermark templates associated with the watermark payload values in the first subset to produce an expanded set of watermark templates; and
the processor executable code, when executed by the processor, configures the device to extract the payload value by at least in-part comparing the candidate watermark payload value obtained from the host content to all templates in the expanded set of watermark templates to obtain a match to within a predefined error tolerance.

43. The device of claim 42, wherein the processor executable code, when executed by the processor, further configures the device to store at least a subset of the expanded set of watermark templates as a look up table (LUT) within the device prior to initiating extraction of the payload value.

44. The device of claim 42, wherein the processor executable code, when executed by the processor, further configures the device to generate at least a subset of the expanded set of watermark templates on-the-fly, subsequent to initiating extraction of the payload value.

45. The device of claim 26, the processor executable code, when executed by the processor, configures the device to conduct a search for payload values that are not designated as belonging to the first subset using non-template-matching error correction code decoding operations.

46. The device of claim 26, wherein the processor executable code, when executed by the processor, further configures the device to allocate fewer resources for extraction of watermark payload values that are not designated as belonging to the first subset compared to the watermark payload values that are designated as belonging to the first subset.

47. The device of claim 46, wherein allocated resources for extraction of all payload values is not increased.

48. The device of claim 26, wherein: each of the watermarked payload values is ranked in an order of importance; and the processor executable code, when executed by the processor, configures the device to prioritize resource allocation by allocating more resources for extraction of a payload value that is ranked as being more important within the first subset compared to a payload value that is ranked as being less important within the first subset.

49. A system comprising the device of claim 26, and further comprising a management center comprising a database, wherein the management center is configured to provide the information indicative of the ranking from the database to the extractor device.

50. The system of claim 48, further comprising a plurality of additional devices, each of the plurality of additional devices comprising a corresponding watermark extractor device, wherein the management center is configured to communicate bi-directionally with each of the plurality of additional devices and with the device.

51. The device of claim 26, wherein the watermark payload value that corresponds to the smallest error count is identified as the extracted watermark payload value upon a determination that the smallest error count is below a predefined error tolerance value.

52. A computer program product, embodied on one or more non-transitory computer readable media, comprising:
program code for receiving a host content at a watermark extractor device;
program code for obtaining, at the watermark extractor device, information indicative of a ranking of a plurality of watermark payload values, the information designating each watermark payload value within a first subset of the plurality of watermark payload values as having an associated rank value;

program code for, based at least in-part on the information indicative of the ranking,
configuring the watermark extractor device to prioritize resource allocation for extraction of payload values that are designated as belonging to the first subset over payload values that are not designated as belonging to the first subset; and
program code for extracting a payload value from one or more watermarks embedded in the host content,
wherein extracting the payload value comprises:
comparing a candidate watermark payload value obtained from the host content to a plurality of constructed error correction code watermark payload templates corresponding to each of the watermark payload values in the first subset,
producing a plurality of error counts, each error count representing a count of mismatched symbols between the candidate watermark payload value and a corresponding constructed error correction code watermark payload template, and
identifying, as the extracted watermark payload value, a watermark payload value that corresponds to the smallest error count, and
wherein the extracted payload value is one of the payload values designated as belonging to the first subset.

53. The A computer program product of claim 52, wherein the watermark payload value that corresponds to the smallest error count is identified as the extracted watermark payload value upon a determination that the smallest error count is below a predefined error tolerance value.

54. A device, comprising:
a receiver configured to receive a host content;
a processor implemented at least in-part in hardware and configured to obtain information indicative of a ranking of a plurality of watermark payload values, the information designating each watermark payload value within a first subset of the plurality of watermark payload values as having an associated value;
the processor further configured to, based at least in-part on the information indicative of the ranking, configure a watermark extractor component to prioritize resource allocation for extraction of payload values that are designated as belonging to the first subset over payload values that are not designated as belonging to the first subset, wherein:
the watermark extractor is configured to extract at least one payload value designated as belonging to the first subset from one or more watermarks embedded in the host content, wherein extraction of the payload value comprises:
comparison of a candidate watermark payload value obtained from the host content to a plurality of constructed error correction code watermark payload templates corresponding to each of the watermark payload values in the first subset,
production of a plurality of error counts, each error count representing a count of mismatched symbols between the candidate watermark payload value and a corresponding constructed error correction code watermark payload template, and
identification, as the extracted watermark payload value, a watermark payload value that corresponds to the smallest error count.

55. The device of claim 54, wherein the watermark payload value that corresponds to the smallest error count is identified as the extracted watermark payload value upon a determination that the smallest error count is below a predefined error tolerance value.

* * * * *